United States Patent
Patel et al.

(10) Patent No.: US 11,776,045 B2
(45) Date of Patent: *Oct. 3, 2023

(54) METHOD, A SYSTEM, AND A NON-TRANSITORY COMPUTER-READABLE STORAGE MEDIUM FOR FULFILLMENT CENTER AND RETAIL STORE FULFILLMENT OF RETAIL ORDERS

(71) Applicant: H-E-B, LP, San Antonio, TX (US)

(72) Inventors: Kedar Dilip Patel, San Antonio, TX (US); David Lee Goans, Jr., San Antonio, TX (US)

(73) Assignee: H-E-B, LP, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,242

(22) Filed: Jun. 23, 2022

(65) Prior Publication Data

US 2022/0327605 A1 Oct. 13, 2022

Related U.S. Application Data

(63) Continuation of application No. 16/407,472, filed on May 9, 2019, now Pat. No. 11,393,014.

(51) Int. Cl.
*G06Q 30/00* (2023.01)
*G06Q 30/0601* (2023.01)
*G06Q 10/087* (2023.01)

(52) U.S. Cl.
CPC ....... *G06Q 30/0639* (2013.01); *G06Q 10/087* (2013.01); *G06Q 30/0635* (2013.01)

(58) Field of Classification Search
CPC .......... G06Q 30/0639; G06Q 30/0635; G06Q 10/087

(Continued)

(56) References Cited

U.S. PATENT DOCUMENTS

2012/0179582 A1 7/2012 Yu et al.
2015/0269521 A1* 9/2015 Knapp ............. G06Q 10/08355
705/338

(Continued)

OTHER PUBLICATIONS

Peapod by Giant opens new fulfillment center: Online grocer expands to serve growing demand. (Nov. 8, 2013). PR Newswire Retrieved from https://www.proquest.com/wire-feeds/peapod-giant-opens-new-fulfillment-center/docview/1449307266/se-2?accountid=14753 (Year: 2013).*

(Continued)

*Primary Examiner* — Arielle E Weiner
(74) *Attorney, Agent, or Firm* — Baker Botts L.L.P.

(57) ABSTRACT

Systems, computer programs, and methods for coordinating automated components and employee activities to facilitate fulfillment of orders for items and/or services sold by retailers and made available for delivery or pick-up at a retail location are provided. In some embodiments, the methods comprise: receiving an order; selecting a preferred source location for each retail item in the order; preparing a first portion of the order at a fulfillment center; preparing a second portion of the order at a first store; preparing a third portion of the order at a second store; combining the first and second order portions and loading the combined order portions onto a transportation vehicle for transfer to the second store; and assembling the order including the first, second, and third order portions at the second store.

19 Claims, 6 Drawing Sheets

(58) Field of Classification Search
USPC .......................................................... 705/26.9
See application file for complete search history.

(56) References Cited

U.S. PATENT DOCUMENTS

| | | |
|---|---|---|
| 2016/0247113 A1 | 8/2016 | Rademaker |
| 2016/0300185 A1 | 10/2016 | Zamer et al. |
| 2016/0342932 A1 | 11/2016 | Imaeda et al. |
| 2017/0083967 A1 | 3/2017 | Shiely et al. |
| 2017/0132393 A1* | 5/2017 | Natarajan ............ G06Q 10/087 |
| 2017/0337523 A1* | 11/2017 | Roach ................ G06Q 10/1097 |
| 2018/0060943 A1* | 3/2018 | Mattingly ............... G06Q 20/12 |
| 2018/0240066 A1 | 8/2018 | Streebin et al. |
| 2018/0253682 A1 | 9/2018 | Tilzer et al. |
| 2018/0276739 A1 | 9/2018 | Chopp |
| 2019/0188772 A1 | 6/2019 | Chaganti et al. |
| 2019/0347606 A1 | 11/2019 | Malecha et al. |
| 2020/0057989 A1* | 2/2020 | Winkle ..................... F25D 3/06 |
| 2020/0217683 A1 | 7/2020 | Herman et al. |
| 2020/0320470 A1* | 10/2020 | Whitney ............ G06Q 30/0201 |

OTHER PUBLICATIONS

Barr, A. (Oct. 7, 2013). Retailers get shippy with it: Take on amazon by fulfilling online orders from stores. Usa Today Retrieved from https://www.proquest.com/newspapers/retailers-get-shippy-with/docview/1439913966/se-2?accountid=14753 (Year: 2013).*

Peapod by Giant opens new fulfillment center: Online grocer expands to serve growing demand. (Nov. 8, 2013). PR Mewswire Retrieved from https://www.proquest.com/wire-feeds/peapod-giant-opens-new-fulfillrnent-center/docview/1449307266/se-2? accountid-14753 (Year: 2013).

* cited by examiner

METHOD, A SYSTEM, AND A NON-TRANSITORY COMPUTER-READABLE STORAGE MEDIUM FOR FULFILLMENT CENTER AND RETAIL STORE FULFILLMENT OF RETAIL ORDERS

CROSS-REFERENCE TO RELATED APPLICATIONS

This application is a continuation of U.S. application Ser. No. 16/407,472, filed May 9, 2019 and entitled "FULFILLMENT CENTER AND RETAIL STORE FULFILLMENT OF RETAIL ORDERS," the contents of which is incorporated by reference herein in its entirety.

BACKGROUND

The present disclosure generally relates to systems, computer programs, and methods for coordinating automated components and employee activities to facilitate fulfillment of orders for items and/or services sold by retailers. These items are either delivered directly to customers or provided to customers for pick-up at a retail location.

In many situations, retailers of goods and services both own and/or operate one or more "brick-and-mortar" retail stores and/or physical facilities where customers may browse, purchase, and/or pick up items at the site, and also provide an online website or other service for receiving orders from customers remotely. In the methods and systems of the present disclosure, such retailers may allow customers to place orders for goods or services via a website or other service for receiving orders. In some instances, the retailer may fulfill those orders to the customer by shipping or delivering the purchased items to the customer's home (or other location designated by the customer). In other instances, the retailer may fulfill the orders by making the set of items purchased by the customer available at a pick-up facility (e.g., a retail store or other "brick-and-mortar" facility) that may be operated or used by the retailer.

Today's consumers demand convenience, speed, selection, and high quality from their retailers regardless of whether such consumers are shopping online or are shopping in a brick-and-mortar establishment. Thus, in order to maximize customer satisfaction, a retailer must meet a consumer's expectations on these attributes when fulfilling items to a customer via delivery or customer pick-up. Delayed or unreliable provision of items may cause customers to be dissatisfied with those systems or the retailer more generally, which ultimately may result in the loss of sales by that retailer. Additionally, where freshness or perishability of the purchased items is important, such as in the context of grocery retailers, ensuring a customer promptly receives items in their freshest form can be difficult.

To meet customers' demand for speed and convenience, existing systems and methods for delivery or pick-up order fulfillment often provide a "curated" list of store items available for purchase. This "curated" list of items limits the items available for purchase to a commonly available subset of items (e.g., the items available in a warehouse or fulfillment center) which may include fewer item types than are carried in a brick and mortar store. Unfortunately, this "curated" list may undesirably limit the selection of items available for online purchase by a customer.

SUMMARY

The present disclosure generally relates to systems, computer programs, and methods for coordinating automated components and employee activities to facilitate fulfillment of orders for items and/or services sold by retailers and made available for delivery or pick-up at a retail location.

In some embodiments, the present disclosure provides methods that comprise: receiving, using a central order management system, an order of a plurality of retail items for pick-up or delivery; selecting for each retail item in the order, using the central order management system, a preferred source location from which to source the retail item, the preferred source location being selected from the group consisting of: a fulfillment center, a first retail store located adjacent the fulfillment center, and a second retail store located remote from both the fulfillment center and the first retail store; preparing a first portion of the order at the fulfillment center, the first portion of the order including the retail items for which the fulfillment center is selected as the preferred source location; preparing a second portion of the order at the first retail store, the second portion of the order including the retail items for which the first retail store is selected as the preferred source location; preparing a third portion of the order at the second retail store, the third portion of the order including the retail items for which the second retail store is selected as the preferred source location; combining the first and second portions of the order and loading the combined first and second portions of the order onto a transportation vehicle; transporting the combined first and second portions of the order to the second retail store via the transportation vehicle; and assembling the order comprising the first portion, the second portion, and the third portion at the second retail store.

In some embodiments, the present disclosure provides methods method permitting fulfillment of one or more orders without limiting retail items selected in the orders to a common subset of retail items that are available from both a first retail store and a second retail store. These methods comprise: receiving, using a central order management system, a first order of a plurality of retail items for pick-up or delivery; selecting, for each retail item in the first order, using the central order management system, a preferred source location from which to source the retail item, the preferred source location being selected from the group consisting of: a fulfillment center, a first retail store located adjacent the fulfillment center, and a second retail store located remote from both the fulfillment center and the first retail store; generating, using one or more order processing servers, one or more tasks associated with preparing a first portion of the first order including the retail items for which the fulfillment center is selected as the preferred source location; generating, using the one or more order processing servers, one or more tasks associated with preparing a second portion of the first order including the retail items for which the first retail store is selected as the preferred source location; generating, using the one or more order processing servers, one or more tasks associated with preparing a third portion of the first order including the retail items for which the second retail store is selected as the preferred source location; generating, using the one or more order processing servers, one or more tasks associated with combining the first and second portions of the first order and loading the combined first and second portions of the first order onto a transportation vehicle for transfer to the second retail store; generating, using the one or more order processing servers, one or more tasks associated with assembling the first order comprising the first portion, the second portion, and the third portion at the second retail store; and performing one or more of the tasks generated using the one or more order processing servers.

In some embodiments, the present disclosure provides systems that comprise: a fulfillment center; a first retail store located adjacent the fulfillment center; a second retail store located remote from both the fulfillment center and the first retail store; and one or more servers comprising a processor and a memory device coupled to the processor, the memory device comprising instructions executable by the processor that, when executed, cause the processor to: receive an order of a plurality of retail items for pick-up or delivery; select, for each retail item in the order, a preferred source location from which to source the retail item, the preferred source location being selected from the group consisting of: the fulfillment center, the first retail store, and the second retail store; generate one or more tasks associated with preparing, at the fulfillment center, a first portion of the order including the retail items for which the fulfillment center is selected as the preferred source location; generate one or more tasks associated with preparing, at the first retail store, a second portion of the order including the retail items for which the first retail store is selected as the preferred source location; generate one or more tasks associated with preparing, at the second retail store, a third portion of the order including the retail items for which the second retail store is selected as the preferred source location; generate one or more tasks associated with combining the first and second portions of the order and loading the combined first and second portions of the order onto a transportation vehicle for transfer to the second retail store; and generate one or more tasks associated with assembling the order comprising the first portion, the second portion, and the third portion at the second retail store.

The features and advantages of the present disclosure will be apparent to those skilled in the art. While numerous changes may be made by those skilled in the art, such changes are within the spirit of the invention and disclosure.

BRIEF DESCRIPTION OF THE FIGURES

Some specific example embodiments of the disclosure may be understood by referring, in part, to the following description and the accompanying figures.

Figure 1:
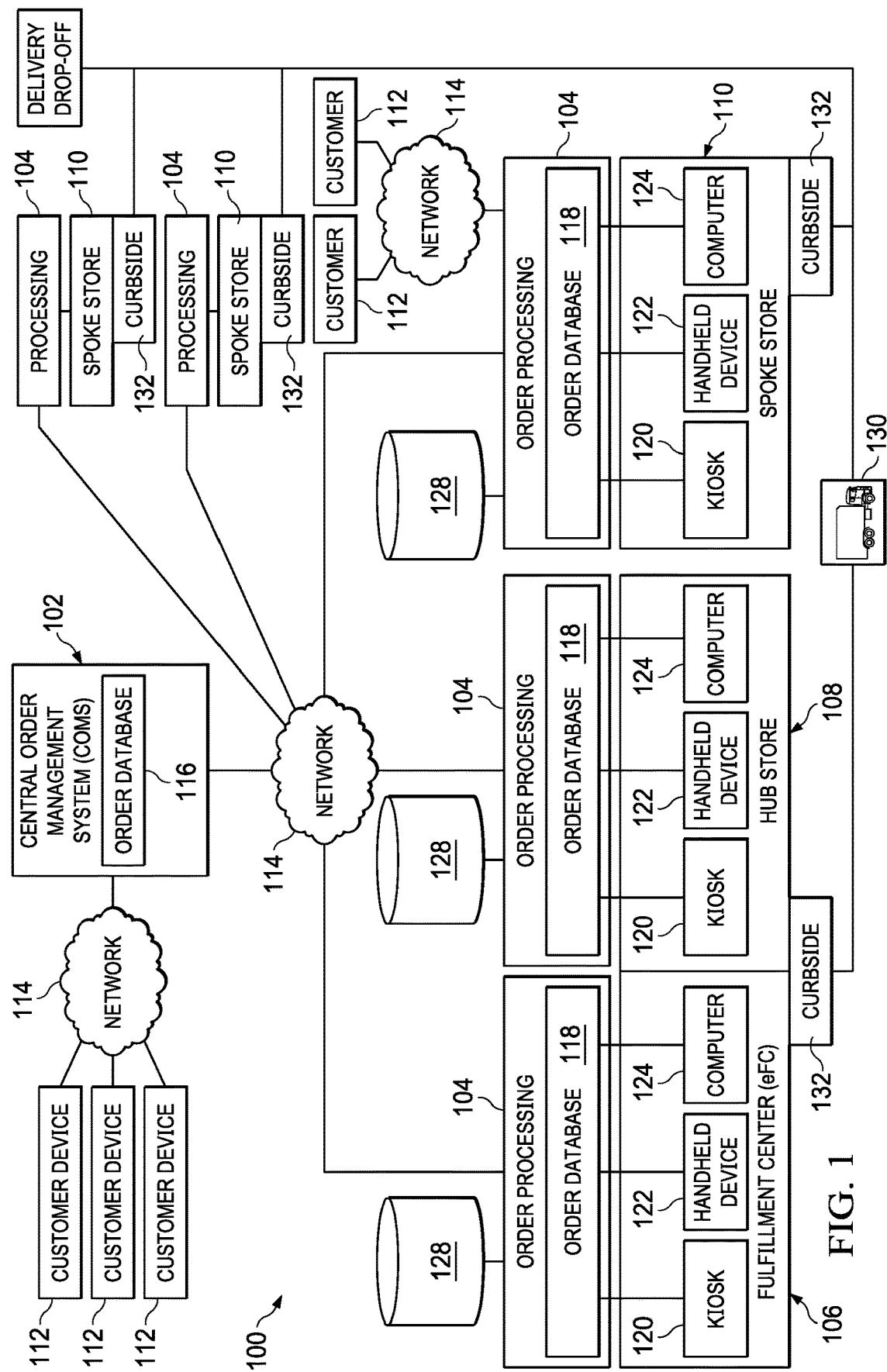
FIG. 1 is a diagram depicting an overview of an order fulfillment system for delivery and/or customer pick-up of items according to certain embodiments of the present disclosure.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION OF EMBODIMENTS

The present disclosure generally relates to systems, computer programs, and methods for coordinating automated components and employee activities to facilitate fulfillment of orders for items and/or services sold by retailers and made available for delivery or pick-up at a retail location.

More particularly, the present disclosure provides systems and methods for determining, for each item in a pick-up or delivery order placed by a customer, a source location from which to source the item while fulfilling the order. The available source locations include at least a fulfillment center, a first retail store (e.g., a hub store) adjacent to the fulfillment center, and a second retail store (e.g., a spoke store) remote from the fulfillment center/hub store. The present disclosure provides systems and methods for generating one or more tasks associated with preparing different portions of the order at each of the three source locations, combining the order portions prepared at the fulfillment center and the hub store, transporting the combined order portions from the fulfillment center/hub store to the spoke store, and assembling the complete order at the spoke store. The present disclosure also provides computer programs stored in a tangible medium comprising a plurality of instructions that when executed cause at least one processor to perform some or all of the methods described herein.

Among the many potential advantages to the methods and systems of the present disclosure, only some of which are alluded to herein, the methods and systems of the present disclosure may provide an efficient means of managing customer orders without limiting the customer to a limited list of items available for purchase for pick-up or delivery orders. The disclosed methods and systems may include selecting, for each retail item in an order, a preferred source location from which to source the retail item, the preferred source location being selected from a fulfillment center, a first retail store which is located adjacent the fulfillment center, and a second retail store which is located remote from both the fulfillment center and the first retail store. The disclosed methods and system may then include generating, using one or more processing servers, tasks associated with preparing different portions of a single order at the different source locations and combining the different portions to form the full order for delivery or pickup. This assignment of different portions of the order to be prepared at different source locations permits the fulfillment of one or more orders without limiting the retail items selected in the orders to a common subset of retail items that are available from both the first and second retail locations. As such, the methods and systems of the present disclosure facilitate quick and efficient fulfillment of pick-up and delivery orders that may include items unique to a customer's local store. In certain embodiments, by not limiting the items available online to a common subset of items available at all store locations, the methods and systems of the present disclosure provide a wider selection of items to the customer for online purchase. This may allow customers to have the experience of shopping at their local store, even while ordering online.

The retailers that may operate or use the methods and systems of the present disclosure may include any entity who sells and/or provides goods or services to customers, including but not limited to grocery retailers. The goods or items provided using the methods and systems of the present disclosure may include any suitable goods. In certain embodiments, the goods or items may include food or grocery items, including but not limited to pre-packaged food items, perishable food items (e.g., meat, produce, delicatessen items, bakery items, etc.), cold or refrigerated items (e.g., milk, yogurt, etc.), dry or ambient items (e.g., pasta, spices, etc.), frozen food items (e.g., ice cream, frozen foods, etc.), or bulk items (e.g., toiler paper, paper towels, packages of water bottles, etc.), and the like. These goods or items may be purchased by the retailer from another source, or may be created, packaged, or prepared (in whole or in part) by the retailer. In some embodiments, the goods or items may be "made to order" and/or customized per the customer's request and/or specifications.

In the methods and systems of the present disclosure, the goods or items may be stored and/or provided as a part of the inventory of multiple separate retail store locations. The term "retail store location" may generally refer to a location at which the retailer sells goods directly to customers within the retail store. In each retail store location, the goods or items may be stored either in a stockroom or in a retail space accessible to customers at the store.

In the methods and systems of the present disclosure, the goods or items may also be stored and/or provided as a part of the inventory of at least one fulfillment center. The term "fulfillment center" refers to a location used specifically for the preparation of orders to be delivered to a destination outside of the fulfillment center. The fulfillment center may not include a retail space accessible to customers and may not allow customers to purchase items or goods within the center. Items from the fulfillment center may be transported to a delivery location for delivery to a customer, to a pick-up location at a separate retail store location for customer pick-up, or both. In certain embodiments, the fulfillment center may occupy a space either physically within or directly adjacent to one of the retail store locations. In other embodiments, the fulfillment center may be a standalone center located remote from each of the retail store locations.

The fulfillment center may be associated with multiple retail store locations, meaning that the same fulfillment center is used to prepare orders to be delivered to any one of the multiple associated retail store locations. In embodiments where the fulfillment center is located within or proximate one of the associated retail store locations, this retail store location is referred to herein as a "hub store." All other retail store locations associated with, but located remote from, the fulfillment center are referred to herein as "spoke stores."

In the methods and systems of the present disclosure, the descriptions of activities of or involving a customer (e.g., pick-up of items, arrival at a pick-up facility, triggering/sending/receiving notifications) may include those activities that may involve or be performed by a customer's agent or designee that has been tasked with receiving a delivery of previously ordered items or picking up previously ordered items from a pick-up facility. In certain embodiments, such an agent or designee may be a representative or employee of a third-party courier, delivery, or shopping company authorized by the customer and/or retailer to pick up items ordered by the customer (either separately or through the third-party company).

FIG. 1 illustrates an example system 100 for implementing an order fulfillment process according to certain embodiments of the present disclosure. This system 100 involves a system configured for client-server interaction and communication, which refers to a distributed system in which a program at one site sends a request to a program at another site and waits for a response. The requesting program is called the "client," and the program which responds to the request is called the "server." Client-server systems may exist in the Internet (which refers to a collection of interconnected (public and/or private) networks that are linked together by a set of standard protocols (such as TCP/IP and HTTP) to form a global, distributed network), the World Wide Web, or other networks either public or private in nature. While this term may refer to what is now commonly known as the Internet, it is also intended to encompass variations which may be made in the future, including changes and additions to existing standard protocols. In the context of the Internet or the World Wide Web, the client is a "Web browser" (or simply "browser") which runs on a computer of a user; the program which responds to browser requests by serving Web pages is commonly referred to as a "Web server." A website or retailer server system of the present disclosure serves informational content over a network, typically using the standard protocols of the World Wide Web.

The system 100 includes a central order management server system ("COMS") 102 operated by a retailer that is connected to (e.g., through a direct communication link or a communication network 114) a plurality of order processing servers 104, each of which may be located at, designated for, or associated with a particular facility. For example, as illustrated, each order processing server 104 may be located at, designated for, or associated with either a fulfillment center 106 (e.g., an e-fulfillment center or "eFC"), a hub store 108, or a spoke store 110. The eFC 106 is linked to the hub store 108 (e.g., through integration into a single building or through the hub store 108 being geographically near the eFC 106). Each eFC 106 and hub store 108 combination may be associated with one or more spoke stores 110. For example, the eFC 106 and hub store 108 may be associated with a plurality of spoke stores 110, each located within a certain proximity to the eFC 106/hub store 108. The distance between the eFC 106/hub store 108 and each associated spoke store 110 may be up to approximately 5 miles, up to approximately 7 miles, up to approximately 10 miles, or more.

In certain embodiments, one or more of the order processing servers 104 may include virtual servers that are physically located on a single piece or group of hardware components at a single physical location (e.g., a retail store or other facility). The central order management system 102 and one or more of the plurality of order processing servers 104 may be connected to and/or communicate with one or more customer devices 112 used by customers through one or more networks 114. Although FIG. 1 illustrates a particular arrangement of customer devices 112, central order management system 102, order processing servers 104, and networks 114, this disclosure contemplates any suitable arrangement of those devices, servers, and networks. Although FIG. 1 illustrates a particular number of customer devices 112, central order management systems 102, order processing servers 104, and networks 114, this disclosure contemplates any suitable number (e.g., one or more) of those components. As an example and not by way of limitation, the system 100 instead may include central order management systems 102 (e.g., servers of multiple different retailers connected to common order processing servers 104 operated by a third party), or a single centralized order processing server that may process information for a plurality of different facilities. As another example and not by way of limitation, one or more order management systems 102 and one or more order processing servers 104 may be physically or logically co-located with each other in whole or in part. The system 100 also may comprise any number of intermediate servers and/or networks between one or more of customer devices 112, central order management system 102, order processing servers 104, and networks 114. For example, the data provided to customer devices 112 for display to a customer and/or data provided to order processing servers 104 may be processed or passed through one or more additional servers or computer systems hosted by a third party network or server provider. Such intermediate servers and/or networks may run additional software or further process data received from customer devices 112 and/or order processing servers 104 before transmission of that data elsewhere in the system.

Server systems used in the methods and systems of the present disclosure such as central order management system 102 and/or order processing servers 104 generally include at least one processor, non-transitory computer readable memory (e.g., random access memory (RAM) or read-only memory (ROM)) that may comprise executable instructions for the processor, and a communications interface configured to transmit data (e.g., pick-up or delivery time notifications and/or data relating thereto) to and receive data (e.g., customer arrival notifications and/or data relating thereto) from other computer systems or devices. The processor may comprise any microprocessor, central processing unit ("CPU"), or other computer processors known in the art, and the communications interface may comprise any type of computer interface device known or used in the art with electronics and computer systems, including but not limited to modems, Ethernet/Wi-Fi/LAN/cellular adapters, serial connections, data bus connections, and other similar types of devices. The processor may include an internal memory device and/or be configured to access a separate memory device or drive comprising executable instructions.

The central order management system also may include multiple redundant servers that operate as mirrors of each other, which may, among other purposes, increase speed of the system and/or help compensate for failures or other problems in the servers. In particular embodiments, the central order management system 102 and/or the order processing servers 104 may be network-addressable computing systems that can host one or more retailer's server systems. In particular embodiments, central order management system 102 and/or order processing servers 104 may be capable of receiving and/or generating communications in the form of email messages, text messages (e.g., SMS, MMS, or any other known format), push notifications, instant messages, voicemails, audio recordings, video recordings, or any other suitable form of electronic messages.

A central order management system 102 may generate, store, receive, and transmit various types of data relating to online orders, including but not limited to item-related data (e.g., images, pricing, item type, stock keeping units ("SKUs"), universal product codes ("UPCs"), inventory availability, perishability, customization options, size/weight data, promotional information, and/or other attributes), order-related data (e.g., pick-up location, pick-up time, delivery location, delivery time, etc.), customer-related data (e.g., names, addresses, phone numbers, e-mail addresses, communication preferences, purchase histories, payment information, preferred retail store, closest retail store, etc.), store-related data (e.g., addresses, store departments, inventory, etc.) and the like. For example, as shown in FIG. 1, central order management system 102 may include an order database 116 that stores data records for orders for items placed by a customer, for example, via an online ordering system. Those orders may be received, for instance, at the central order management system 102 and parsed or processed into a form necessary for storage in the order database 116. This may include creating one or more order records in the form of a data structure that corresponds to a customer's order and includes customer-related data associated with the customer, the items within the order, and other information associated with the order, including, but not limited to, the spoke store at which the order will be completed, a pick-up location, a pick-up date, a pick-up time, a delivery address, a delivery time, among others. The data structure may also be populated, for instance, with item-related data, such as a UPC and/or SKU, associated with the items in the order that is retrieved from other databases associated with the central order management system 102. The central order management system 102 may be accessed by and/or communicate with the other components of system 100, either directly or via a network or a third-party system.

The order processing servers 104 may generate, store, receive, and transmit various types of data relating to online orders (or items in such orders) to be sourced from the associated store or fulfillment center. Example types of that data are discussed below, and the data may include but is not limited to item-related data, customer-related data, store-related data, pick-up order related data, delivery-related data, and the like.

The order processing servers 104 may generate, store, receive, and transmit item-related data for online orders. Item-related data may include any type of data relating to one or more items in an online order. Such item-related data may include, for example, item identification information such as a UPC or SKU. Item-related data may include item inventory availability within the associated store or fulfillment center, as accessible via an inventory database 128. Item-related data may include the perishability of the item (e.g., expiration date, date a perishable food item was prepared at the store, date a fresh produce item was received at the store or fulfillment center, etc.). Item-related data may include customization (e.g., instructions for customizing a food item to be prepared at the store according to a certain recipe, design, color, text, and so forth). Item-related data may include a size or weight of the item, a desired put-away location (e.g., shelf position) of the item, and/or other attributes.

The order processing servers 104 may generate, store, receive, and transmit customer-related data for online orders. Customer-related data may include any type of data relating to a customer who placed the online order. Such customer-related data may include, for example, customer identification information such as a name of the customer or a name of another person picking up the customer's order. Customer-related data may include contact information, such as an address, a phone number, an e-mail address, and communication preferences for how this contact information is to be used. Customer-related data may include purchase histories for orders previously placed with the retailer and/or for orders previously placed and filled for pick-up at a particular retail store. The purchase histories may include, for each previously filled order, a list of items purchased, a time/date of delivery or pick-up, method of payment, and whether the order was for delivery or pick-up. Customer-related data may include a list of preferred items determined using the purchase history information. Customer-related data may include a preferred store determined using the purchase history information. Customer-related data may include payment information, such as information for one or more credit cards or debit cards that were previously used by the customer, and in some instances an indication of a preferred method of payment. The customer information may be stored within a customer profile accessible by the one or more order processing servers 104.

The order processing servers 104 may generate, store, receive, and transmit store-related data for online orders. Store-related data may include any type of data relating to the associated store or fulfillment center where at least a portion of the order will be filled. Such store-related data may include, for example, store identifying information such as a name of the store location or a store address. Store-related data may include contact information for the store, such as a phone number or e-mail address for the store. Store-related data may include a list of departments, sections, aisles, and so forth located within the associated store or fulfillment center, including, e.g., a produce department, a bakery, a meat processing area, a frozen food department, a chilled food department, dry goods department, bulk goods department, seasonal items department, a pharmacy, and so forth. Store-related data may include inventory information, including, but not limited to, a live inventory of items available within the store or fulfillment center or a list of inventory that is regularly stocked at the store or fulfillment center. Store-related data may include runner personnel information, including name and contact information for runners who will be preparing orders at the store or fulfillment center. Store-related data may include a information regarding a pick-up location or a process and associated equipment for picking up orders from the store.

The order processing servers 104 may generate, store, receive, and transmit delivery-related data for online orders designated for delivery. Delivery-related data may include any type of data relating to a delivery request associated with the order. Such delivery-related data may include, for example, a delivery address where the delivery will be provided. Delivery-related data may include contact information for the customer who placed the order for delivery. This contact information may include a phone number and/or an email address. Delivery-related data may include one or more communication preferences designating how the customer prefers to be contacted during the delivery.

As shown in FIG. 1, order processing servers 104 may include order databases 118 that store data records or structures for orders for items to be fulfilled from the associated store or fulfillment center. In certain embodiments, the order databases 118 may be populated by a certain number of order records sent by the central order management system 102 or accessed from the order database 116. Alternatively, orders may be transmitted from the central order management system 102 to the processing servers 104, where the servers 104 may process the order to generate and store order records in the order databases 118.

One or more customers may use one or more customer devices 112 to access, send data to, and receive data from order processing servers 104. In certain embodiments, one or more computing devices such as kiosks 120, handheld devices 122, and computer terminals 124 provided at the facility and/or operated by personnel at the facility may be connected to the order processing servers 104 to access, send data to, and receive data from order processing servers 104. In certain embodiments, the personnel-operated computing devices (e.g., a portable computing device or handheld computing device) may interact with or otherwise modify the order records in the order databases 118. The personnel-operated computing devices may further receive electronic communications from the order processing server 104. A customer device 112, kiosk 120, handheld device 122, or computer terminal 124 may access or communicate with an order processing server 104 directly, via a network (e.g., similar to network 114), or via a third-party system.

A customer device 112, kiosk 120, handheld device 122, and/or computer terminal 124 may include any suitable computing device, such as, for example, a laptop computer, a cellular phone, a smartphone, a personal digital assistant, an ultra-mobile PC, a computing tablet, a portable media player, a pocket computer, or the like. In many embodiments, the customer device 112 is a portable device such as a smart phone or tablet that a customer can easily carry when they enter a pick-up facility or are at a delivery location. In particular embodiments, the customer device 112 includes a processor, a non-transitory computer readable memory (e.g., RAM or ROM) that comprises executable instructions for the processor, and a communication interface. Kiosks 120 and/or computer terminals 124 also may comprise other forms of computing devices, including desktop computers, thin client terminals, and the like. In certain embodiments, suitable customer devices 112, kiosks 120, handheld devices 122, and/or computer terminals 124 may comprise storage, an input/output (I/O) interface, communication buses, and other components. This disclosure contemplates any suitable device having any suitable number of any suitable components in any suitable arrangement. The customer device, kiosk, handheld device, and/or computer terminal may include, incorporate, or interface with various types of input and output devices. Suitable output devices may include, but are not limited to, display monitors, audio speakers, printers, or the like. Suitable input devices may include, but are not limited to, touch screens, mouses, keyboards, microphones, motion detection systems/sensors, near-field communication devices, scanners (e.g., barcode scanners), cameras, or the like.

Networks 114 may be any suitable communications networks. As an example and not by way of limitation, one or more portions of networks 114 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 114 may include one or more networks 114.

Various types of connections may connect customer devices 112, the central order management system 102, order processing servers 104, networks 114, kiosks 120, handheld devices 122, and/or computer terminals 124 and/or third party carrier servers to each other. This disclosure contemplates any suitable connections. In particular embodiments, one or more connections include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections each include an ad hoc network, an intranet, an extranet, a VPN, a LAN, a WLAN, a WAN, a WWAN, a MAN, a portion of the Internet, a portion of the PSTN, a cellular telephone network, another connection, or a combination of two or more such connections. The connections need not necessarily be the same throughout system 100. One or more first connections may differ in one or more respects from one or more second connections.

Figure 5:
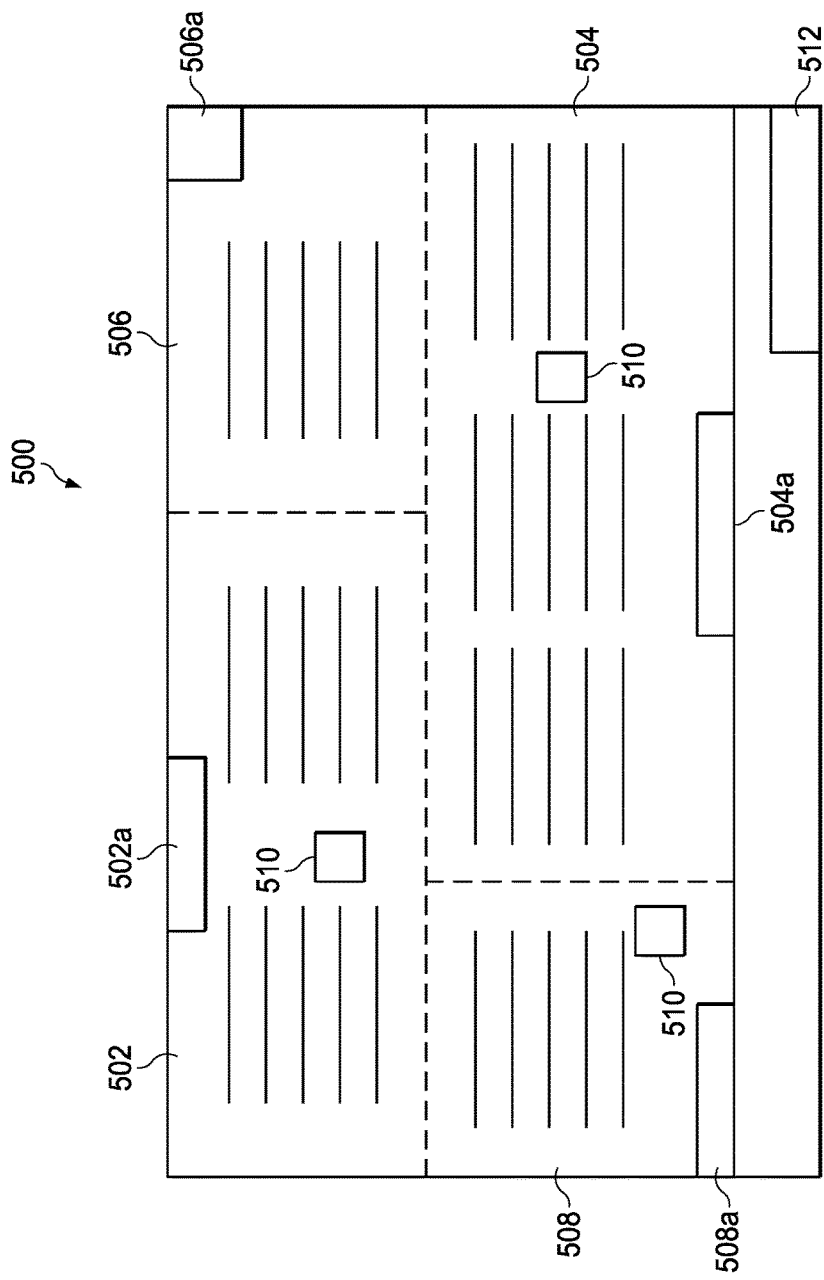
FIG. 5 is a schematic diagram of an example fulfillment center according to certain embodiments of the present disclosure.

According to aspects of the present disclosure, an online order from a customer (for pick-up or delivery) may trigger a fulfillment process that controls the manner in which the order is sourced, filled, and provided to the customer. The fulfillment process may be guided or otherwise controlled by one or more of the server systems 102 and 104, which may generate one or more tasks associated with the order and communicate some or all of those tasks to employees via personnel-operated computing devices, e.g., kiosks 120, handheld devices 122, and computer terminals 124. In some instances, the server systems 102 and 104 may generate one or more tasks associated with the order and output one or more control signals to automation equipment located at one or more of the source locations to perform certain tasks. For example, as illustrated in FIG. 5, the fulfillment center 500 may be equipped with one or more pieces of automation equipment 510 that may be operated via control signals to retrieve items within the fulfillment center 500 for preparation of one or more orders.

The above described tasks may be generated, for instance, using one or more processing algorithms implemented as software in one or more of the server systems 102 and 104, and may be represented as a separate data structure or as data structures associated with a particular order. In certain embodiments, the order processing servers 104 may generate the tasks based, at least in part, on an order record received from the central order management system 102, communicate the tasks to employees via network-connected personnel-operated computing devices, receive task completion confirmations from employees via the network-connected personnel-operated computing devices, and monitor the progress of the fulfillment process in one or more data structures, which may include the order record stored in the order databases 118 associated with the servers 104. In certain embodiments, at least some of the tasks may be triggered by customer communications received at one or more of the server systems 102 and 104.

A more detailed description of various aspects of the fulfillment process in accordance with presently disclosed embodiments will now be provided. The central order management system 102, alone or in cooperation with the order processing servers 104, may coordinate the sourcing of individual items within an incoming order from one or more available locations including, but not limited to, the fulfillment center 106, the hub store 108, and the spoke stores 110. Specifically, the central order management system 102, alone or in cooperation with the order processing servers 104, may determine for each item within an incoming order a desired location from which the item is to be sourced. For each order, the desired source location for a given item is selected from at least one of the fulfillment center 106, the hub store 108, and one of the spoke stores 110. For each order placed by a customer for pick-up or delivery, the central order management system 102 may output one or more separate order records to the order processing servers 104 associated with the fulfillment center 106, the hub store 108, and/or a selected spoke store 110.

As mentioned above, the fulfillment center 106 is generally in close proximity to and/or associated with the hub store 108. The fulfillment center 106 and hub store 108 together may be associated with and may serve a number of spoke stores 110. Although only three spoke stores 110 are illustrated in FIG. 1, it will be understood that each fulfillment center 106/hub store 108 combination may service any desired number of spoke stores 110. For example, the fulfillment center 106/hub store 108 may service 2, 3, 4, 5, 6, 7, 8, 9, 10, 11, 12, or more spoke stores 110. In certain embodiments, the number of spoke stores 110 associated with and serviced by a given fulfillment center 106/hub store 108 may be determined based, at least in part, on throughput (e.g., in units/week, or dollars/week) of online orders being placed for pick-up or delivery from the stores within a given region. In the event that certain store locations within a region begin to experience larger throughput than before, then the associated fulfillment center 106/hub store 108 may become overwhelmed to the point of being able to only service a smaller number of spoke stores 110 in the region. At this point, a second fulfillment center 106/hub store 108 could then be used to service a first group of the available spoke stores 110, while the already existing fulfillment center 106/hub store 108 continues to service a second group of the spoke stores 110. The spoke stores 110 being serviced by a given fulfillment center 106/hub store 108 may be located in relatively close proximity (e.g., within a few miles) to the fulfillment center 106/hub store 108.

Upon receiving a new order at the central order management system 102, the central order management system 102 may assign a single spoke store 110 (from the multiple available spoke stores 110) to the order. The central order management system 102 may assign a spoke store 110 to each order based, at least in part, on the item-related data, order-related data, customer-related data, and/or store-related data. For example, when an order is designated for pick-up at a particular retail store, that store will be the spoke store 110 assigned for order fulfillment. In certain embodiments, an order is designated for pick-up at a particular retail store by a consumer selecting the particular retail store when placing a pick-up order. In other embodiments, the order is designated for pick-up at a particular retail store based, at least in part, on customer-related data (e.g., a customer's preferred store or the closest store to a customer's home address). When an order is designated for delivery to a location remote from the retail stores, the central order management system 102 may assign the spoke store 110 that is closest geographically to the delivery address. In other embodiments, when an incoming order for delivery contains one or more items that are only available at one of the spoke stores 110, the central order management system 102 assigns the spoke store 110 in which these items are available.

In order to determine the source location for various items within a given order, the central order management system 102 may access one or more inventory databases 128 for one or more of the available source locations (i.e., fulfillment center 106, hub store 108, and/or spoke stores 110). The central order management system 102 may access inventory databases 128 for the different locations via communication with the corresponding order processing servers 104, or directly through a network. Each inventory database 128 may include a list of available items at the specific source location, a list of types or attributes of items carried at the source location, a list of store departments at the source location, a stocking location for each of the items, and the like.

The inventory available at each individual source location (i.e., fulfillment center 106, hub store 108, and spoke stores 110) may be different from the inventory available at any other source location accessible by the central order management system 102. For example, the fulfillment center 106 and the different stores 108 and 110 may each have overlapping but different inventories available at any given time. In some embodiments, the list of items, item types, or other attributes of items that are sold at the hub store 108 and the spoke stores 110 may be unique to each store. For example, although the stores 108 and 110 may generally have an amount of overlap in their inventories, each store 108 and 110 may also sell a large number of items (e.g., approximately 2,000 to 3,000 SKUs) that are unique to the store location. Items that are unique to a particular store location are referred to herein as "long tail items." Regardless of a current stocking level at a given store, the long tails items for that store are not available from the fulfillment center. In some embodiments, the long tail items are not available for other retail stores. As such, each source location's inventory represents a subset of a total amount of inventory available to a customer placing an order for pick-up or delivery via the central order management system 102.

The central order management system 102 may access the inventory databases 128 associated with each of the different source locations (i.e., fulfillment center 106, hub store 108, and spoke stores 110) to determine a full list of items available from all locations. In some embodiments, the central order management system 102 may present the full list of items available at all locations to a customer for selection during placement of the order by the customer. In other embodiments, the central order management system 102 may only present a list of items available at the fulfillment center 106, the hub store 108, and a selected (or assigned) spoke store 110 to a customer for selection during placement of the order. That way, all items available to the customer may be entirely sourced from a total of three or fewer source locations (fulfillment center 106, hub store 108, and selected spoke store 110), while still allowing the customer to access all long tail items within the selected spoke store 110. For a customer selecting items for delivery nearby or pick-up at their local or designated store (the selected spoke store 110), the full inventory for that store (including long tail items) is made available to the customer on the customer device 112.

The central order management system 102 may access the inventory databases 128 associated with different source locations (i.e., fulfillment center 106, hub store 108, and spoke stores 110) to determine the locations from which to source each item that is ordered from the total available list of items. In some embodiments, the inventory database 128 for one or more of the available source locations (fulfillment center 106, hub store 108, and individual spoke stores 110) may be a database of live inventory for that location. A live inventory database may be continually updated as items are removed from the location. In some embodiments, maintaining an accurate live database 128 may only be possible for the fulfillment center 106 (and not the hub store 108 or spoke stores 110) since the fulfillment center 106 includes a smaller subset of items stored therein and has fewer ways for the items to be removed therefrom than in a full service retail store.

For each order placed by a customer for pick-up or delivery, the central order management system 102 may output one or more separate order records to the order processing servers 104 associated with the fulfillment center 106, the hub store 108, and/or a selected spoke store 110.

Once the central order management system 102 has determined preferred source locations for each of the items in an order, the central order management system 102 may then output separate order records to the order processing servers 104 for the fulfillment center 106, the hub store 108, and/or the selected spoke store 110. These order records include lists of items to be sourced from the different locations. Upon receiving the order records, each order processing server 104 may generate or communicate one or more tasks to employees at the location (and/or output control signals to automation equipment at the location) for fulfillment of the subset of order items being sourced from that location. In response to the one or more tasks (and/or automation control signals), the different subsets of items may be gathered at separate source locations, transported to a final source location (e.g., the selected spoke store 110), and combined into the full order at this final source location. Transportation vehicles 130 may transport the order subsets between the fulfillment center 106, hub store 108, and multiple spoke stores 110 according to a loading/delivery schedule. The loading/delivery schedule may be generated via the central order management system 102 and/or the individual order processing servers. Once at the final source location, the subsets of an order are combined into the complete order and either moved to a staging or pick-up location (e.g., curbside 132 at the spoke store 110) or delivered to a remote location via a transportation vehicle 130.

Figure 2:
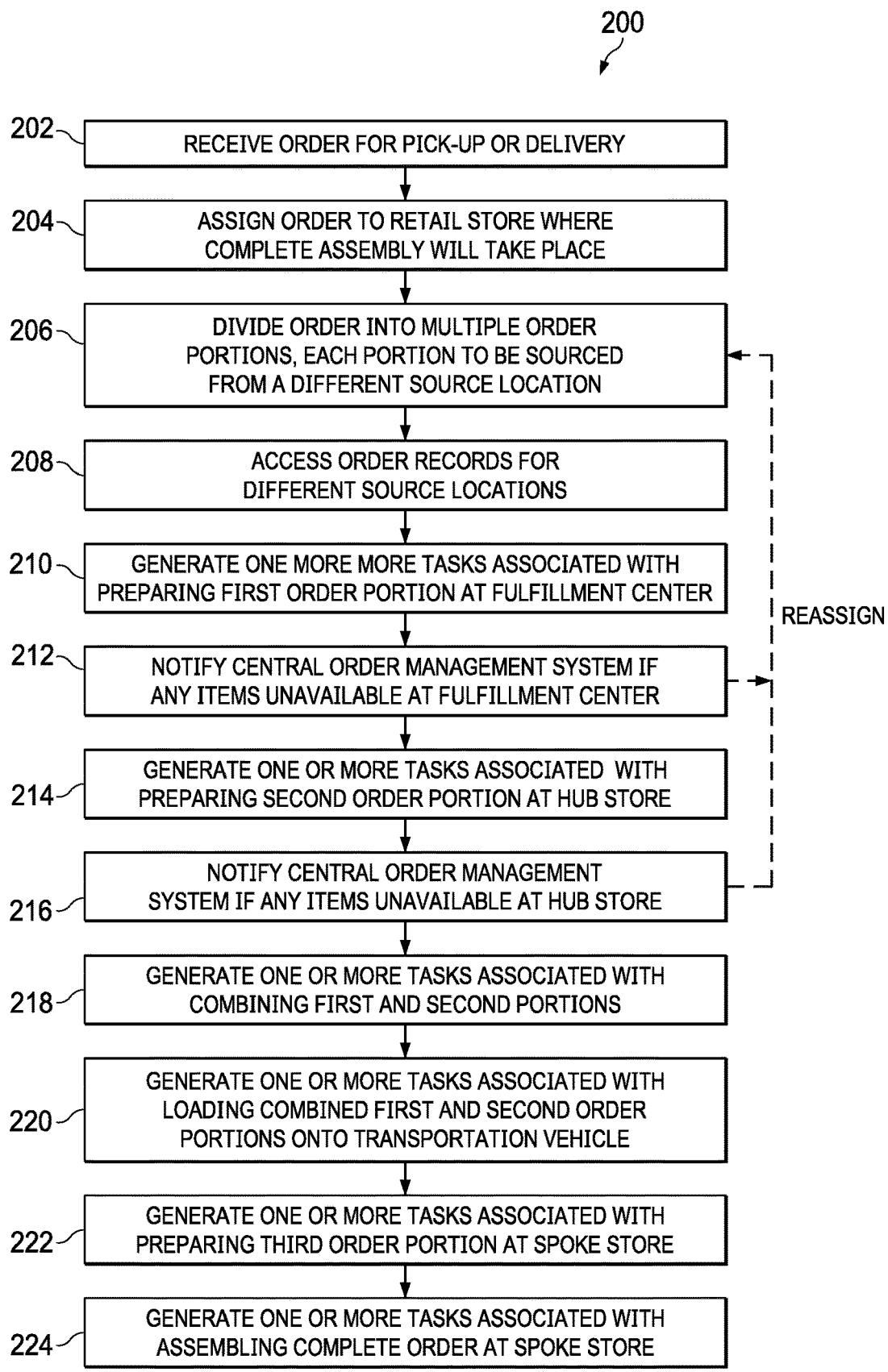
FIG. 2 is a process flow diagram of a method for preparing a customer's order for delivery or customer pick-up according to certain embodiments of the present disclosure.

FIG. 2 is a flowchart illustrating an example fulfillment process 200 of the present disclosure that may be used to facilitate the preparation and pick-up/delivery of items in an order placed with the retailer. At step 202, the process 200 may be triggered when an order from a customer is received. The order may be placed by a customer, for instance, through an online ordering system or by phone, or during a prior visit to a retail store or other facility operated by the retailer.

In embodiments where the order is a pick-up order, the particular facility where the customer will pick up their order and/or a scheduled date/time window when the order can be made available for pick-up (e.g., an earliest date/time when the order will be available) is selected and/or assigned at the time that the order was placed or at any other point in time prior to pick-up. The pick-up facility and/or the scheduled date/time for pick-up may be selected and/or assigned by the customer, the retailer, or a third party involved in the processing of the order.

In embodiments where the order is a delivery order, the delivery address where the customer will receive their order and/or a scheduled date/time window when the order can be delivered (e.g., an earliest date/time when the order will be available for delivery) is selected and/or assigned at the time that the order was placed or at any other point in time prior to delivery. The scheduled date/time for delivery may be selected and/or assigned by the customer, the retailer, or a third party involved in the processing of the order.

In certain embodiments, the order may be received at one or more server systems associated with the order fulfillment process. This includes, for instance, the central order management system 102 described above with reference to FIG. 1. Receiving the order may include receiving a data structure associated with the order and storing the data structure within one or more databases. For instance, when an order is made through an online ordering system, the order may be packaged in a data structure that can be stored directly into an order database. Additionally, when an order is received by phone, an employee of the retailer may input the order into a system that generates or stores data within the associated data structure for the order. Alternatively, receiving the order may include processing and parsing the order to generate a data structure associated with the order that is of the form accepted by an order database.

At block 204, in the embodiment shown, the order may be assigned to one retail store (out of multiple available retail stores within a region) at which the order will be fully assembled for pick-up or delivery. The retail store may be assigned automatically, for instance, by a central order management system associated with the fulfillment process. The central order management system may assign the order to a particular retail store based, at least in part, on information included in the order such as, for example, a desired pick-up location, proximity of a delivery address, or items included in the order that are unique to the particular retail store In certain embodiments, the order is designated for pick-up at a particular retail store based, at least in part, on customer-related data (e.g., a customer's preferred store or the closest store to a customer's home address). The retail store to which the order is assigned may be one of multiple spoke stores (110 of FIG. 1) associated with a fulfillment center/hub store.

At block 206, in the embodiment shown, the order is divided into multiple order portions, each order portion to be sourced from a different source location. Different available source locations may include, for example, a fulfillment center (106 of FIG. 1), a hub store (108 of FIG. 1), and a spoke store (110 of FIG. 1). Each order portion may include a subset of one or more items from the order placed by the customer. The order may be divided into multiple order portions automatically, for instance, by a central order management system associated with the fulfillment process. The order may be divided into multiple order portions instantaneously or nearly instantaneously upon receipt of the order at the central order management system. In other instances, the order may be divided into multiple order portions at a set period of time before a scheduled pick-up/delivery time. For instance, the order may be divided into order portions automatically when the associated source locations open on the day during which the pick-up or delivery is scheduled to occur. To divide the order into multiple order portions at block 206, the central order management system (102 of FIG. 1) may access one or more inventory databases (128 of FIG. 1) associated with the different available source locations to determine which source location to use for sourcing the different items of the order.

In embodiments where the retail store assigned at block 204 is a spoke store (110 of FIG. 1), it may be desirable to source a majority of the order from the fulfillment center (106 of FIG. 1), fewer items of the order from the hub store (108 of FIG. 1), and the fewest number of items (if any remaining) from the spoke store. The central order management system may assign each item within the order to a preferred source location according to a specific set of rules.

Figure 3:
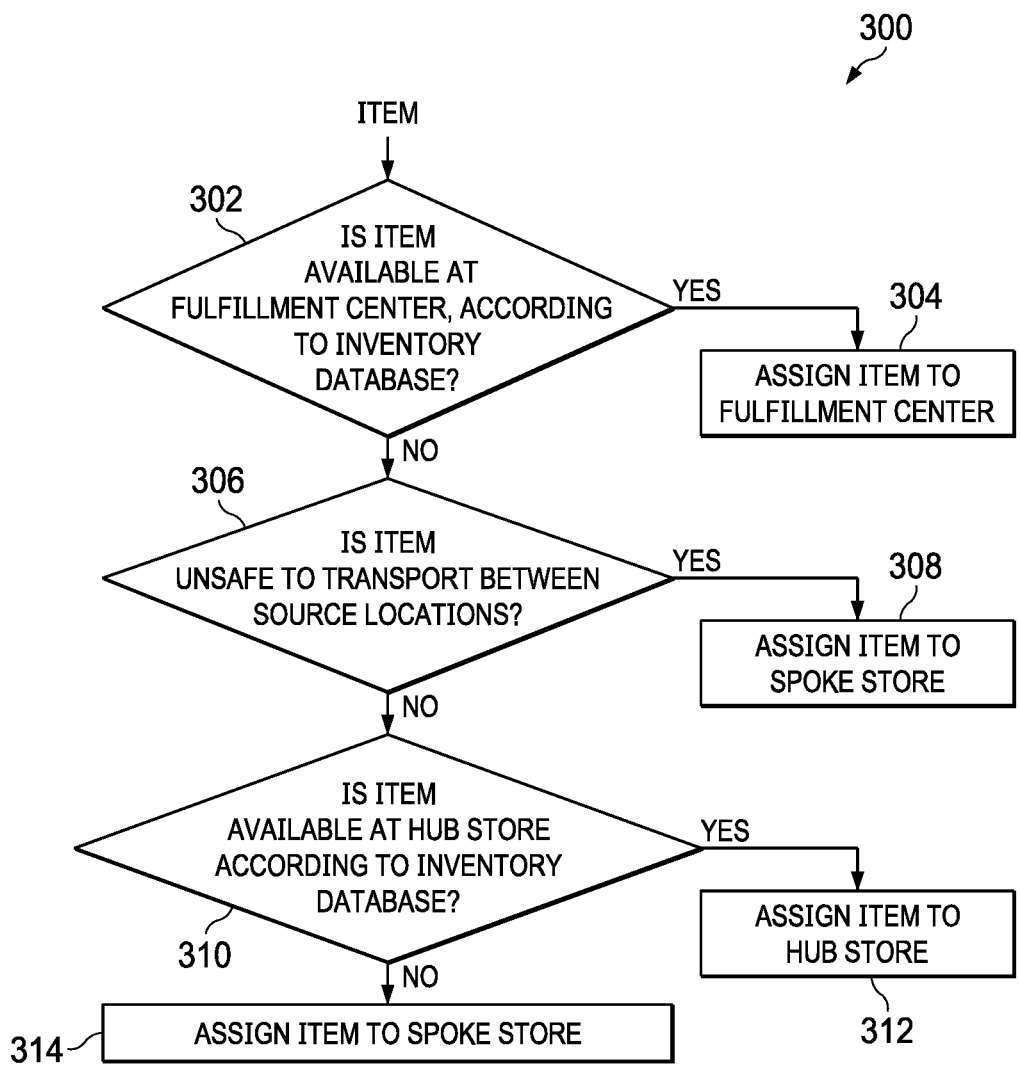
FIG. 3 is a process flow diagram of a method for determining a preferred source location to which to assign an item for fulfillment according to certain embodiments of the present disclosure.

An example process 300 for assigning a preferred source location to an order item in accordance with the present disclosure is illustrated in FIG. 3. The central order management system may perform this process for each item within an order received from a customer. At block 302, the central order management system may query an inventory database of the fulfillment center, which may be a live database, to determine whether the item (or a set of multiple units of the same item) is currently available at the fulfillment center. If the item (or set of multiple units of the item) is available, the process ends at block 304 where the central order management system assigns the item to the fulfillment center for fulfillment. In embodiments where the order includes multiple units of the same item type, the central order management system may determine at block 302 whether the entire set of multiple units of the item is available from the fulfillment center. If a total number of the requested units of the item (e.g., boxes of macaroni and cheese) is not available from the fulfillment center, the entire line item of the multiple units of the item may instead by assigned to the hub store or spoke store for fulfillment. As such, none of these items may be sourced from the fulfillment center.

If the item (or set of multiple units of the same item) is unavailable from the fulfillment center, the process continues to block 306 where the central order management system determines whether the item is unsafe or undesirable to transport between source locations, such as if the item is a hot food item (e.g., rotisserie chicken). If the item is unsafe or undesirable to transport between source locations, the process ends at block 308 where the central management system assigns the item to the spoke store for fulfillment. If the item is safe to transport between source locations, the process continues to block 310 where the central order management system queries an inventory database of the hub store to determine whether the item is stocked in the hub store. If the item is regularly stocked in the hub store, the process ends at block 312 where the central order management system may assign the item to the hub store for fulfillment. If the item is not stocked in the hub store, the process ends at block 314 where the central order management system assigns the item to the spoke store for fulfillment.

As a result of the above process, the fulfillment center may be selected to fulfill approximately 60% to 95% of the items in the order, more specifically approximately 70% to 90% of the order, or more specifically approximately 80% of the order. Items to be sourced from the fulfillment center may include items that are common to all stores of the retailer and that do not require in-store preparation. For example, the fulfillment center may be selected for supplying toilet paper, milk, eggs, flour, etc.

The hub store may be selected to fulfill approximately 0% to 30% of the items in the order, more specifically approximately 10% to 20% of the order, and more specifically approximately 15% of the order. Items to be sourced from the hub store may include any items that require human or industrial (deli slicer, grinder) capital. For example, the hub store may be selected for supplying fresh sliced deli meat, ground beef, bakery items, and others. The hub store may also be selected for supplying any items that are not stocked at the fulfillment center and that are not unique to the spoke store.

The spoke store may be selected to fulfill approximately 0% to 10% of the items in the order, more specifically approximately 2% to 7% of the order, and more specifically approximately 5% of the order. Items to be sourced by the spoke store may include any items that are unique to the spoke store (e.g., long tail items) and items that are not desirable or are unsafe to be transported between source locations (e.g., rotisserie chickens). The spoke store may also be selected to source items that are determined to be out of stock at the fulfillment center/hub store; such items may be referred to as "kick-outs." The spoke store may also be selected to source items that can be obtained faster from the spoke store than from the hub store, so as to complete an order with a fast delivery/pick-up timeline; such items may be referred to as "leakage."

Turning back to FIG. 2, at block 208, the order processing servers associated with the different source locations (e.g., fulfillment center, hub store, spoke store) may receive, retrieve, or access an order record from the central order management system. The order record that can be accessed for each source location includes the list of items in the order portion specific to that location. The central order management system may monitor the entire order/process being fulfilled at the distributed source locations and provide updated order records to the locations as needed, for example, in the event one or more items is unavailable at the preferred location. In some embodiments, all of the order processing servers being used to fill the order may have access to the entire order/process being monitored at the central order management system. That is, the order processing servers may each be able to access or view the continuously updated order records at all locations. In other embodiments, only the order processing server associated with the spoke store may have access to the entire order/process being monitored at the central order management system.

At block 210, one or more tasks associated with preparing the order portion assigned to the fulfillment center may be generated automatically. The one or more tasks associated with preparing the order portion at the fulfillment center may be generated automatically, for instance, by one or more server systems associated with the fulfillment process at a set period of time before the scheduled pick-up or delivery time for the order. For instance, the one or more tasks may be generated automatically when the fulfillment center opens on the day during which the pick-up or delivery is scheduled to occur. One or more tasks associated with preparing the order portion at the fulfillment center may include tasks communicated to employees at the fulfillment center, control signals output to one or more pieces of automation equipment at the fulfillment center used to move items, and others.

In certain embodiments, there may be one or more sub-categories of items to be prepared to form the order portion at the fulfillment center based, at least in part, on common characteristics of products within a particular type. For instance, in the grocery retailer context, fulfillment center items may be subdivided into items based, at least in part, on one or more products characteristics (e.g., whether the items are frozen, produce, cold, dry, ambient, bulk), such that a first part of the order portion includes in-stock frozen items and a second part of the order portion include in-stock produce. Generating the one or more tasks associated with preparing the order portion at the fulfillment center may include parsing or otherwise grouping at least some of the items of the order portion into categories based, at least in part, on the product characteristics. The items may be grouped or categorized, for instance, by referencing a UPC of each item with a database that identifies a product type or location associated with the item, and then grouping or associating data structures associated with like-items within the order portion.

In certain embodiments, the one or more tasks associated with preparing the order portion at the fulfillment center may comprise tasks associated with collecting and packaging in-stock items for the order portion. For instance, one or more tasks may be generated for each in-stock order portion and transmitted to employees via personnel-operated computing devices, e.g., handheld devices 122. The multiple prepared parts of the order portion may be left at one or more staging areas of the fulfillment center and/or the hub store.

In some embodiments, the one or more tasks associated with preparing the order portion at the fulfillment center may comprise the use of one or more carts. The carts may comprise shelves supporting a plurality of bins in which items of the order portion may be placed. In some embodiments, the bins may be removable from the carts and/or movable within a cart. In certain embodiments, the bins may not be removable and may comprise a portion of the cart. In certain embodiments, the use of carts may allow preparation of order portions at the fulfillment center for multiple different orders at the same time. For example, in certain embodiments, two or more bins may be used to hold order portions of at least two different pick-up/delivery orders. Employees may use a cart to collect items for the at least two orders and store them in the plurality of bins. In some embodiments, the one or more tasks may comprise instructions to use a cart to prepare order portions for a plurality of pick-up/delivery orders.

In certain embodiments, the one or more carts may be mobile. For example, in certain embodiments, the one or more carts may comprise mobile means enabling the cart to be moved from one location to another. In certain embodiments, for example, the cart may comprise wheels, rollers, tracks, or similar components suitable to allow the cart to be moved. In some embodiments, the carts may be motorized, manually moveable, or both. In some embodiments, carts may be automated. In some embodiments, a cart may comprise a personnel-operated computing device, e.g., a portable computing device. The personnel-operated computing device may, for example, comprise a portion of the cart or be permanently or detachably attached to the cart.

In some embodiments, different parts of the order portion at the fulfillment center may be assigned to a cart based, at least in part, on the item size, item type, or location in the fulfillment center. For example, in certain embodiments, dry items of the order portion may be assigned to a first cart and frozen items of the order portion may be assigned to a second cart. In certain embodiments, dry items of the order portion may be assigned a first cart, frozen items of the order portion may be assigned to a second cart, cold items of the order portion may be assigned to a third cart, and bulk items of the order portion may be assigned to a fourth cart. In certain embodiments, generating the one or more tasks may comprise determining the optimal assignment of items in one or more order portions being fulfilled at the fulfillment center to bins in one or more carts. Optimization may comprise optimizing for space, efficiency, preparation time, or other suitable factors. The optimal assignment of items, for example, may comprise an assignment of items to bins that results in the least amount of bins used per order portion or the least amount of bins used per dry, frozen, cold, or bulk part of the order portion.

If any items within the order portion assigned to the fulfillment center are not actually available or in stock at the fulfillment center, a notification (block 212) may be provided to the central order management system. In some embodiments, the notification may be transmitted through a personnel-operated computing device, e.g., handheld device 122, to one or more server systems associated with the fulfillment process 200. In other embodiments, the notification may be automatically generated by a processing component on a piece of automation equipment in the fulfillment center upon the equipment not being able to located or detect the presence of the desired item. Once the notification is received, the central order management system may reassign (e.g., "kick-out") the missing item(s) from the fulfillment center to the hub store for fulfillment.

In some embodiments, the order may include a set of multiple units of the same item that were assigned to the fulfillment center for sourcing, and it may be determined at the time the first order portion is being prepared that only an incomplete set of the multiple units can be sourced from the fulfillment center. In some instances, this may be due to there not being a desired number of units available at the fulfillment center. In other instances, this may be due to one or more of the units being past their expiration date or damaged. In some embodiments, the notification (block 212) may be provided to the central order management system with the item and total number of unit(s) in the item set. The central order management system may then reassign (e.g., "kick-out") the entire set of multiple units of the same item from the fulfillment center to the hub store for fulfillment.

In other embodiments, the incomplete set of available units of the item within the fulfillment center may be sourced from the fulfillment center as part of the first order. The notification (block 212) may be provided to the central order management system with the item and number of units(s) from the set that were unavailable. Once the notification is received, the central order management system may reassign (e.g., "kick-out") the missing one or more units of the set from the fulfillment center to the hub store for fulfillment. This approach may be particularly useful when the unavailable unit(s) are unavailable due to being past an expiration date, since the items in the set that are available may be similarly approaching an expiration date and it is desirable to keep this inventory moving out of the fulfillment center. Upon completion of the one or more tasks associated with preparing the order portion at the fulfillment center, a notification may be provided to one or more servers associated with the fulfillment process 200. The notification may be transmitted through a personnel-operated computing device, e.g., handheld device 122, to the one or more servers.

At block 214, one or more tasks associated with preparing the order portion assigned to the hub store may be generated automatically. The one or more tasks associated with preparing the order portion at the hub store may be generated automatically, for instance, by one or more server systems associated with the fulfillment process at a set period of time before the scheduled pick-up or delivery time for the order. For instance, the one or more tasks may be generated automatically when the hub store opens on the day during which the pick-up or delivery is scheduled to occur. One or more tasks associated with preparing the order portion at the hub store may include tasks communicated to employees at the hub store.

In certain embodiments, there may be one or more subcategories of items to be prepared to form the order portion at the hub store, based, at least in part, on common characteristics of products within a particular type. Generating the one or more tasks associated with preparing the order portion at the hub store may include parsing or otherwise grouping at least some of the items of the order portion into categories based, at least in part, on the product characteristics. The items may be grouped or categorized, for instance, by referencing a UPC of each item with a database that identifies a product type or location associated with the item, and then grouping or associating data structures associated with like-items within the order portion.

In certain embodiments, the one or more tasks associated with preparing the order portion at the hub store may comprise tasks associated with collecting and packaging in-stock items for the order portion. For instance, one or more tasks may be generated for each in-stock order portion and transmitted to employees via personnel-operated computing devices, e.g., handheld devices 122.

The one or more tasks associated with preparing the order portion at the hub store may include tasks associated with making a product (such as a baked item), prepping a product (such as slicing deli meat), or collecting and packaging one or more items that were shipped to the hub store. The employees may receive the one or more tasks and proceed to prepare the order portion or parts of the order portion associated with each task. The multiple prepared parts of the order portion may be left at one or more staging areas of the fulfillment center and/or the hub store.

As discussed above with reference to the fulfillment center, the one or more tasks associated with preparing the order portion at the hub store may comprise the use of one or more carts. The carts may comprise shelves supporting a plurality of bins in which items of the order portion may be placed. In some embodiments, the one or more tasks may comprise instructions to use a cart to prepare order portions for a plurality of pick-up/delivery orders. In certain embodiments, the one or more carts may be mobile. In some embodiments, a cart may comprise a personnel-operated computing device, e.g., a portable computing device. In some embodiments, different parts (e.g., dry, frozen, cold, and/or bulk items) of the order portion at the hub store may be assigned to a cart based, at least in part, on the item size, item type, or location in the hub store. In certain embodiments, generating the one or more tasks may comprise determining the optimal assignment of items in one or more order portions being fulfilled at the hub store to bins in one or more carts.

If any items within the order portion assigned to the hub store are not available or in stock at the hub store, a notification (block 216) may be provided to the central order management system. The notification may be transmitted through a personnel-operated computing device, e.g., handheld device 122, to one or more server systems associated with the fulfillment process 200. In response to receiving this notification, the central order management system may reassign (e.g., "kick-out") the missing item(s) from the hub store to the spoke store for fulfillment.

In some embodiments, the order may include a set of multiple units of the same item that were assigned to the hub store for sourcing, and it may be discovered at the time the second order portion is being prepared that only an incomplete set of the multiple units can be sourced from the hub store. In some instances, this may be due to there not being a desired number of units available at the hub store. In other instances, this may be due to one or more of the units being past their expiration date or damaged. In some embodiments, the notification (block 216) may be provided to the central order management system with the item and total number of unit(s) in the item set. The central order management system may then reassign (e.g., "kick-out") the entire set of multiple units from the hub store to the spoke store for fulfillment.

In other embodiments, the incomplete set of available units of the item within the hub store may be sourced from the hub store as part of the second order. The notification (block 216) may be provided to the central order management system with the item and number of unit(s) from the set that were unavailable. Once the notification is received, the central order management system may reassign (e.g., "kick-out") the missing one or more units of the set from the hub store to the spoke store for fulfillment. This approach may be particularly useful when the unavailable unit(s) are unavailable due to being past an expiration date, since the items in the set that are available may be similarly approaching an expiration date and it is desirable to keep this inventory moving out of the hub store.

Upon completion of the one or more tasks associated with preparing the order portion at the fulfillment center, a notification may be provided to one or more servers associated with the fulfillment process 200. The notification may be transmitted through a personnel-operated computing device, e.g., handheld device 122, to the one or more servers.

At block 218, in the embodiment shown, one or more tasks associated with combining the order portion prepared at the fulfillment center with the order portion prepared at the hub store may be generated. The one or more tasks associated with combining these two order portions may be generated automatically, for example, by one or more server systems associated with the fulfillment process at a set period of time before the scheduled pick-up or delivery time for the order. For instance, the one or more tasks may be generated automatically at a set number of hours (e.g., 1, 2, or 3 hours) in advance of the scheduled pick-up or delivery time. In other embodiments, the one or more tasks associated with combining the two order portions may be generated automatically upon receiving a notification that both order portions are assembled. That is, the one or more tasks associated with combining the two order portions may be generated automatically upon receipt of notifications sent from both the fulfillment center and the hub store indicating that the tasks associated with generating the respective order portions have been completed.

In certain embodiments, the one or more tasks associated with combining the order portion prepared at the fulfillment center with the order portion prepared at the hub store may comprise positioning the one or more carts holding the prepared order portion from the fulfillment center nearby the one or more carts holding the prepared order portion from the hub store. The carts containing these prepared portions (i.e., fulfillment center portion and hub store portion) of the order may be positioned at one or more staging areas (e.g., in the fulfillment center) or at a specified loading location (e.g., curbside or loading dock). The items making up the order portion from the fulfillment center may be disposed on one or more carts, and the items making up the order portion from the hub store may be disposed on one or more additional carts. These may be the same carts that were used in preparing the order portions at the fulfillment center and the hub store, respectively. The carts may be positioned near each other so that they can loaded onto a transportation vehicle one after the other in a pre-determined loading order, since they are being transported to the same spoke store. The carts may be mobile, so that the carts can be easily loaded onto a transportation vehicle.

In other embodiments, the one or more tasks associated with combining the order portion prepared at the fulfillment center with the order portion prepared at the hub store may comprise consolidating the order portions into one or more carts for transportation to the spoke store. Specifically, items of the order portion prepared at the fulfillment center may be removed from the one or more carts that were previously loaded at the fulfillment center and placed onto one or more carts that are designated for transport to a particular spoke store. Items of the order portion prepared at the hub store may be removed from the one or more carts that were previously loaded at the hub store and placed onto the same one or more carts that are designated for transport to the spoke store, along with the fulfillment center-sourced items. The one or more new carts may be mobile, so that these new carts can be easily loaded onto a transportation vehicle.

In some embodiments, one or more different parts (e.g., dry, frozen, cold, and/or bulk items) of the two order portions prepared at the fulfillment center and the hub store may be assigned to the same cart based, at least in part, on the item size or item type. For example, in certain embodiments, dry items of the two order portions of the same order may be assigned to a first cart designated for transport to the spoke store and frozen items of the two order portions may be assigned to a second cart designated for transport to the spoke store. In certain embodiments, dry items of the two order portions may be assigned a first cart, frozen items of the two order portions may be assigned to a second cart, cold items of the order portion may be assigned to a third cart, and bulk items of the order portion may be assigned to a fourth cart; all four of these carts are designated for transport to the same spoke store.

When multiple orders placed via the fulfillment system are assigned the same spoke store, the one or more tasks associated with combining the order portions may include combining order portions sourced from the fulfillment center and the hub store for multiple orders onto the same one or more carts designated for transport to the spoke store. In certain embodiments, generating the one or more tasks may comprise determining the optimal assignment of items in one or more orders being fulfilled at the fulfillment center/hub store to bins in the one or more carts designated for transport to the spoke store. Optimization may comprise optimizing for space, efficiency, preparation time, or other suitable factors. The optimal assignment of items, for example, may comprise an assignment of items to bins that results in the least amount of bins used per order portion or the least amount of bins used per dry, frozen, cold, or bulk part of the order portion. Optimization may comprise ensuring that all items grouped from the fulfillment center and hub store onto a single cart are designated for transportation to the same spoke store.

Upon completion of the one or more tasks associated with combining the two order portions, a notification may be provided to one or more servers associated with the fulfillment process 200. The notification may be transmitted through a personnel-operated computing device, e.g., handheld device 122, to the one or more servers. The notification may be communicated via the one or more servers to the order processing server of the spoke store to initiate the generation of one or more tasks at the spoke store.

At block 220, in the embodiment shown, one or more tasks associated with loading the combined order portions onto a transportation vehicle may be generated. The one or more tasks associated with loading the combined order portions onto a transportation vehicle may be generated automatically, for example, by one or more server systems associated with the fulfillment process at a set period of time before the scheduled pick-up or delivery time for the order. In other embodiments, the one or more tasks associated with loading the combined order portions onto a transportation vehicle may be generated automatically upon receiving a notification that the order portions have been combined, or that one or more carts containing combined order portions for multiple orders have been prepared for transportation.

The one or more tasks associated with loading the combined order portions onto a transportation vehicle may include loading one or more carts from a staging area onto a transportation vehicle with a pre-determined loading order. The loading order may be determined via one or more servers associated with the fulfillment process 200 based, at least in part, on cart-related data (e.g., designation for particular spoke store, type of items per cart, etc.), pick-up/delivery related data (e.g., pick-up time, pick-up location, delivery time, delivery address, etc.), store-related data (e.g., addresses, etc.), traffic-related data, and the like. The pre-determined loading order may follow a last-order-in-is-first-order-out ("LIFO") sequence based, at least in part, on a transportation route determined for the transportation vehicle. The transportation route may include an order in which the transportation vehicle stops at multiple spoke stores and remote delivery locations. The transportation route may be optimized based, at least in part, on traffic patterns and pick-up/delivery time constraints for multiple orders being serviced by the transportation vehicle. The central order management system may communicate (e.g., via a network) with a personnel communication device within the transportation vehicle, thereby providing the pre-determined transportation route to the transportation vehicle driver.

At block 222, one or more tasks associated with preparing the order portion assigned to the spoke store may be generated automatically. The one or more tasks associated with preparing the order portion at the spoke store may be generated automatically, for instance, by one or more server systems associated with the fulfillment process at a set period of time before the scheduled pick-up or delivery time for the order. For instance, the one or more tasks may be generated automatically when the spoke store opens on the day during which the pick-up or delivery is scheduled to occur. In some embodiments, the one or more tasks associated with preparing the order portion at the spoke store may be generated automatically upon receipt of one or more notifications at the order processing server of the spoke store that the fulfillment center order portion and hub store order portion have been prepared, combined, and/or loaded onto the transportation vehicle. One or more tasks associated with preparing the order portion at the spoke store may include tasks communicated to employees at the spoke store.

In certain embodiments, there may be one or more sub-categories of items to be prepared to form the order portion at the hub store, based, at least in part, on common characteristics of products within a particular type. Generating the one or more tasks associated with preparing the order portion at the spoke store may include parsing or otherwise grouping at least some of the items of the order portion into categories based, at least in part, on the product characteristics. The items may be grouped or categorized, for instance, by referencing a UPC of each item with a database that identifies a product type or location associated with the item, and then grouping or associating data structures associated with like-items within the order portion.

In certain embodiments, the one or more tasks associated with preparing the order portion at the spoke store may comprise tasks associated with collecting and packaging in-stock items for the order portion. For instance, one or more tasks may be generated for each in-stock order portion and transmitted to employees via personnel-operated computing devices, e.g., handheld devices 122.

The one or more tasks associated with preparing the order portion at the spoke store may include tasks associated with obtaining hot food items, prepared food items, and other similar items that are not safely transportable between facilities. One or more prepared parts of the order portion may be left at one or more appropriate staging areas of the spoke store.

As discussed above with reference to the fulfillment center/hub store, the one or more tasks associated with preparing the order portion at the spoke store may similarly comprise the use of one or more carts, with or without a plurality of bins.

Figure 4:
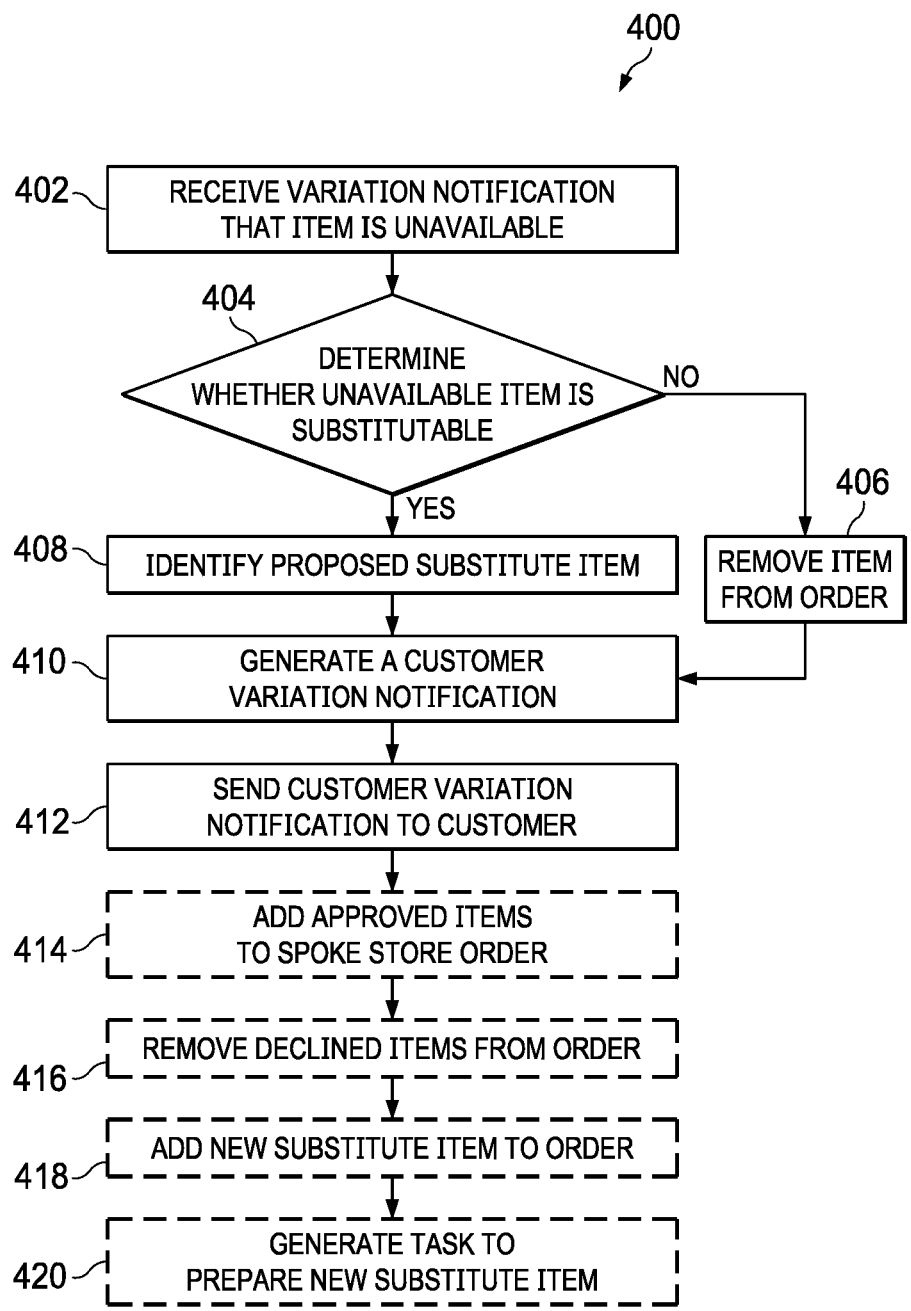
FIG. 4 is a process flow diagram of a method for facilitating the substitution of unavailable items according to certain embodiments of the present disclosure.

If any items within the order portion assigned to the spoke store are not available or in stock at the spoke store, the fulfillment system may proceed according to the process illustrated in FIG. 4. FIG. 4 is a flowchart illustrating an example process 400 of the present disclosure that may be used to facilitate the substitution of unavailable items once the items are unavailable from the spoke store. At block 402, a variation notification may be received that at least one item of an order portion being source from the spoke store is unavailable. In some embodiments, the variation notification may be generated by a personnel-operated computing device. At block 404, in response to the variation notification, an order processing server may determine whether the item is substitutable. In certain embodiments, determining whether an item is substitutable may comprise comparing the item UPC with a list of substitutable items available at the spoke store or looking up a database with information on whether that item is substitutable. If the item is not substitutable (e.g., it is a unique item with no close analog), it may be removed from the order 406 so that the customer is not charged for the item. If the item is substitutable, a proposed substitute item may be identified at block 408. Blocks 402-408 may be repeated for additional unavailable items in the order portion being prepared at the spoke store. At block 410, a variation customer notification may be generated using the order processing server associated with the spoke store. In certain embodiments, the variation customer notification may comprise a list of the unavailable items and any proposed substitute items. For example, in certain embodiments, the variation customer notification may be a text message and may comprise a link to the list of unavailable items. In some embodiments, the variation customer notification may provide an option for the customer to respond to the proposed substitute items. For example, in certain embodiments, the variation customer notification may allow the customer to accept, decline, or search for a new substitute item in response to a proposed substitute item. At block 412, the variation customer notification is sent to a customer. The variation customer notification and/or the customer's response may be sent via text message, e-mail, mobile application, or other communication.

In some embodiments, if the customer approves the item, it is added to the spoke store order portion 414. In certain embodiments, if the customer declines the item, it is removed from the order 416. In some embodiments, the variation customer notification may allow the customer to select and/or search for a different substitute item. If the customer selects a different or new substitute item, it may be added to the order portion 418. In some embodiments, a task may be generated to prepare the new substitute item for pick-up/delivery 420.

Turning back to FIG. 2, upon completion of the one or more tasks associated with preparing the order portion at the fulfillment center, a notification may be provided to one or more servers associated with the fulfillment process 200. The notification may be transmitted through a personnel-operated computing device, e.g., handheld device 122, to the one or more servers.

At block 224, one or more tasks associated with assembling a complete order for pick-up or delivery at the spoke store may be generated. The one or more tasks associated with assembling the complete order may be generated automatically, for example, by one or more server systems associate with the spoke store upon notification that the transportation vehicle has arrived at the spoke store. Such a notification may be generated upon detection of a GPS signal indicating the transportation vehicle has arrived at the spoke store. One or more tasks associated with assembling the complete order at the spoke store may include tasks communicated to employees at the spoke store. The one or more tasks associated with assembling a complete order for pick-up or delivery at the spoke store may comprise consolidating the order portion prepared at the spoke store with the previously combined fulfillment center/hub store order portions. These order portions may be stored together in carts and/or bins as described at length above. The complete order may in some instances be spread between carts designated for different types of items (e.g., ambient temperature, frozen, cold, and/or bulk).

In embodiments where the order is a pick-up order to be picked up by the customer or a third party at the spoke store, the one or more tasks associated with assembling the complete order may involve unloading the order portions (fulfillment center/hub store sourced) from the transportation vehicle and combining these order portions with the order portion sourced from the spoke store. Unloading the order portions (fulfillment center/hub store sourced) from the transportation vehicle may involve unloading one or more carts from the transportation vehicle designated for the particular spoke store. The one or more carts designated for the different spoke stores along the pre-determined transportation route may be easy to remove at the appropriate spoke store, due to the carts' initial placement on the transportation vehicle in a last-order-in-is-first-order-out ("LIFO") configuration. After the cart(s) are unloaded and order portions from the fulfillment center/hub store combined with the order portion at the spoke store, the complete order may be left at one or more appropriate staging areas of the spoke store for pick-up. Empty carts and/or bins may be loaded onto the transportation vehicle from the spoke store for transporting back to the fulfillment center/hub store.

Upon completion of the one or more tasks associated with assembling a complete order for pick-up, a notification may be provided to one or more servers associated with the fulfillment process 200. The notification may be transmitted through a personnel-operated computing device, e.g., handheld device 122, to the one or more servers. The notification may be communicated via the one or more servers to the order processing server of the spoke store to initiate the generation of one or more tasks at the spoke store. The process 200 may further include, in response to the notification, automatically generating one or more tasks associated with moving one or more complete orders to a pick-up location within the spoke store. The one or more tasks may be automatically generated by one or more server systems associated with the fulfillment process. As described above, the different parts of the order may be tracked or otherwise identified within data structures associated with the pick-up order. In certain embodiments, one task may be generated for each part of the pick-up order, and the task may include instructions to move the associated and packaged portion of the pick-up order to a designated pick-up location within the spoke store. Once the complete order has been moved to the pick-up location within the spoke store, the employee responsible for the associated task may confirm that the task has been completed through an electronic transmission from a personnel-operated computing device to one or more servers associated with the fulfillment process 200.

In embodiments where the order is a delivery order to be delivered to a customer or third party at a delivery address remote from the store, the one or more tasks associated with assembling the complete order may involve loading the order portion sourced from the spoke store onto the transportation vehicle. The one or more tasks may include combining the order portion from the spoke store with the previously loaded order portions from the fulfillment center/hub store on the transportation vehicle. The complete order may be left on the transportation vehicle for delivery to the customer in an order determined by the transportation schedule. Upon completion of the one or more tasks associated with assembling a complete order for delivery, a notification may be provided to one or more servers associated with the fulfillment process 200.

In addition, one or more notifications may be provided to one or more server systems during transportation of various items to or from multiple spoke stores in accordance with the pre-determined transportation route. The notification(s) may be transmitted through a personnel-operated computing device, e.g., handheld device 122, to one or more server systems associated with the fulfillment process 200. One or more notifications may signal completion of a stop/unloading of items transported to a final spoke store destination, for example, when the items are part of an order designated for pick-up from the spoke store. One or more notifications may signal completion of a stop/loading of items from the spoke store onto the transportation vehicle, for example, when the items are part of an order designated for delivery to a location remote from the retail stores. One or more notifications may signal completion of a delivery stop/unloading of items transported to a final delivery destination remote from the retail stores.

In an example implementation, a customer may submit an on-line order containing a plurality of items, a phone number associated with the order, and a pick-up time and pick-up facility for the order. The order may include one or more items that may include, but are not limited to, items in stock at a fulfillment center, items that must be made in a retail store, and items that are unique to a particular store location (e.g., a spoke store). The order may be received at a central order management system, as described above. Once received, the items of the order may each be assigned a preferred source location including one of a fulfillment center, a hub store associated with the fulfillment center, and a spoke store remote from the fulfillment center/hub store. Upon determining the preferred source locations for each item in the order, tasks are generated to facilitate preparation of order portions at each of the fulfillment center, the hub store, and the spoke store. The prepared order portions from the fulfillment center and the hub store are combined and transported to the spoke store, where the complete order is assembled for pick-up at the designated pick-up time.

FIG. 5 illustrates an example fulfillment center 500 that has been divided into a plurality of sectors 502-508, each illustrated with shelves or other display features. The sectors 502-508 may comprise different types of products. For instance, in a grocery retailer context, sectors 502 and 504 may comprise boxed items, sector 506 may comprise frozen items, and sector 508 may comprise fresh produce. Items that are in stock may be categorized based, at least in part, on the sector in which they are located within the store. The items within the same sector may be grouped together and form one part of the order portion assigned to the fulfillment center.

When the fulfillment center 500 opens on a day during which it is used to source an order portion, tasks associated with preparing one or more parts of the order portion may be generated automatically. For instance, if the order portion included three frozen items and four items of fresh produce, two tasks for the order portion may be generated, one to collect and package the frozen items, and one to collect and package the produce. In certain embodiments, some or all of the sectors 502-508 may have designated staging areas 502a-508a in which the prepared and packaged portions of the order may be left after they are prepared and packaged. For instance, the staging area 506a for sector 506, which contains the frozen items, may comprise a freezer dedicated to holding packaged portions of pick-up orders. Similarly, the staging area 508a for sector 508, which contains produce, may comprise a refrigerator dedicated to holding packaged parts of the order portion. Other staging areas may include shelves or other segregated areas where packaged parts of the order portion may be left.

The tasks for preparing and packaging the order portion may be received by one or more employees on handheld electronic devices. In certain embodiments, a task for a particular part of the order portion may comprise a list of items included in that part of the order that must be collected and packaged.

In certain embodiments, at least some of the tasks for preparing and packaging the order portion may be received via control signals sent to one or more pieces of automation equipment 510 located in the fulfillment center 500. This automation equipment 510 may include one or more robotic pickers that are programmed to remove certain items from one or more sectors 502-508 within the fulfillment center 500. The automation equipment 510 may include other types of components used to move goods as well, such as conveyors, lifts, etc. The control signals may instruct the automation equipment to collect and/or package a list of items within the order portion. The fulfillment center may use a combination of automation equipment and employees directed by tasks output to handheld electronic devices to prepare the order portion. For any given order portion being prepared at the fulfillment center 500, automation equipment 510 may collect approximately 30% to 70% of the items in the order portion, more specifically approximately 40% to approximately 60% of the order portion, or more specifically approximately 50% of the order portion.

At a desired time, tasks associated with moving the prepared parts of the order portion from their staging area to a particular loading location in the fulfillment center may be automatically generated and transmitted to employees. One loading location 512 is indicated in FIG. 5, but it should be appreciated that more than one loading location within the fulfillment center 500 is possible.

One or more employees may receive the tasks through their electronic device, identify the correct part of the order portion from its associated staging area, and move the prepared portion of the order to the loading location 512. The tasks may comprise moving the prepared parts of an order portion from one or more bins on one or more carts to the loading location 512. In certain embodiments, one or more pieces of automation equipment 510 at the fulfillment center may receive the tasks via control signals, identify the correct part of the order portion from its associated staging area, and move the prepared portion of the order to the loading location 512. Once at the loading location 512, the order portion is ready to be loaded onto a transportation vehicle for transportation to the spoke store. The order portion prepared at an adjacent hub store may be combined with the order portion prepared at the fulfillment center 500 at any point during the process outlined with reference to FIG. 5.

Figure 6:
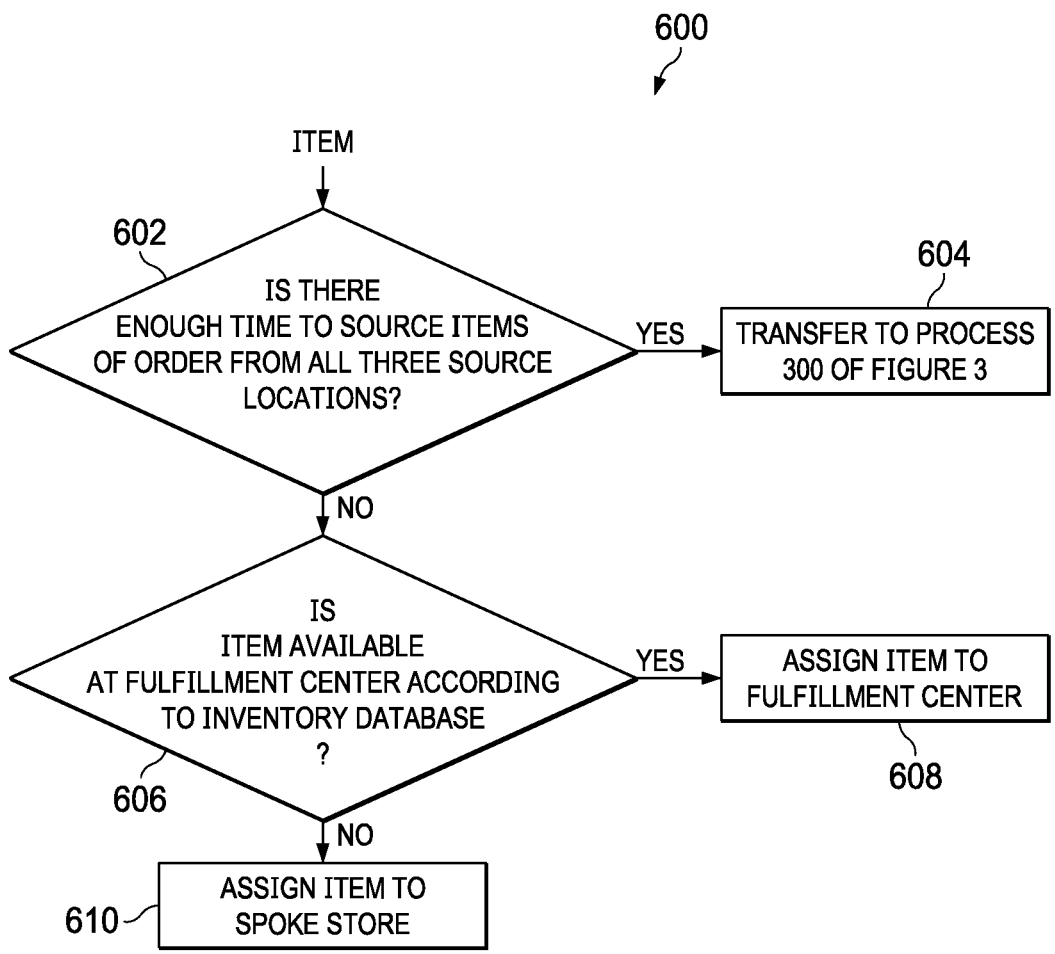
FIG. 6 is a process flow diagram of a method for determining a preferred source location to which to assign an item for fulfillment according to certain embodiments of the present disclosure.

At certain times, the fulfillment process may have to operate on a relatively compressed timeline compared to normal order fulfillment operations. This may be the case, for example, when a customer places an order with less than approximately 6 hours remaining before the selected pick-up/delivery time. In such instances, the disclosed fulfillment system may operate according to an alternate process where order portions are only assigned to the fulfillment center and the spoke store, but not to the hub store. The central order management system may assign each item within the fast turn-around order to a preferred source location according to the following set of rules. FIG. 6 provides an example process 600 for assigning a preferred source location to an order item in accordance with the present disclosure. The central order management system may perform this process for each item within an order received from a customer. At block 602, the central order management system may determine whether or not there is enough time from when the order was placed to source items of the order from all three of the fulfillment center, the hub store, and the spoke store. This may involve determining whether the amount of time remaining is less than a predetermined threshold. If there is enough time available to source the order from all three locations, the process transfers (block 604) to the process of FIG. 3 described above. If there is not enough time available to source the order from all three locations, then at block 606 the central order management system queries an inventory database of the fulfillment center to determine whether the item is currently available at the fulfillment center (608). If the item is unavailable from the fulfillment center, the process ends at block 610 where the central order management system assigns the item to the spoke store for fulfillment. This is a planned "leakage" of order items from what would otherwise be a hub store order portion to the spoke store order portion so as to save time in preparing the complete order.

By filling the order using only the spoke store in combination with the fulfillment center, the disclosed fulfillment system may be able to more efficiently put together and deliver the order portions to a final destination (e.g., pick-up location or delivery location) since several steps are cut out of the process. These steps that are cut out include preparing the order portion at the hub store and combining the hub store items with the fulfillment center items for transportation to the remote spoke store.

It should be noted that at some point the order throughput of the fulfillment system 100 of FIG. 1 may become too high for the fulfillment center 106 and hub store 108 to continue servicing all of the spoke stores 110 associated therewith. At such times, it may be desirable to convert a nearby existing retail store (preferably one with a low customer volume) into a second hub store 108 that sources both the "fulfillment center" order portions and "hub store" order portions for orders being prepared for a subset of the spoke stores 110. That way, the burden of high order volume is lifted from the original fulfillment center 106/hub store 108 temporarily until the time at which a new fulfillment center 106 can be constructed within the region.

In still other disclosed embodiments, the fulfillment system of FIG. 1 may not include a hub store at all, but may instead utilize just the fulfillment center 106 to source order portions for incoming orders to go out to the various spoke stores 110. This may be the case particularly where a fulfillment center has a very large footprint that keeps it from being placed next to a retail store. In such embodiments, the process of FIG. 2 may be utilized, without the steps of assigning/gathering an order portion at a hub store and combining this order portion with the order portion sourced by the fulfillment center.

In addition to many advantages that would be appreciated by a person of ordinary skill in the art in view of this disclosure, the above described process may help facilitate efficient preparation of pick-up and/or delivery orders from a retailer while offering the customer a wide variety of retail items to choose from when placing the order. In certain embodiments, the methods and systems of the present disclosure may allow customers to select long tail items unique to their local store for purchase on-line with a fast pick-up or delivery turnaround. In some embodiments, the methods and systems of the present disclosure may avoid the high cost of additional machinery and man-power at a dedicated order fulfillment center by using already available equipment and workers at the adjacent hub store to source certain products.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
   receiving from a customer device, using a central order management system, data related to an order of a plurality of retail items for pick-up or delivery, wherein the data from the customer device is packaged in a first data structure;
   parsing, using the central order management system, the data packaged in the first data structure into a second data structure by creating one or more order records comprising a first set of customer-related data, store-related data associated with a retail store, and at least one of the plurality of retail items, wherein the second data structure is suitable for storage in an order database and the first data structure is not suitable for storage in the order database;
   storing, using the central order management system, the parsed data in the order database;
   selecting for each retail item in the order, using the central order management system, a preferred source location from which to source a retail item of the plurality of retail items, the preferred source location being selected from the group consisting of: a fulfillment center and the retail store, wherein the retail store is located remote from the fulfillment center, and wherein selecting the preferred source location for each retail item in the order comprises:
      determining, using the central order management system, whether the retail item is undesirable or unsafe to transport between different source locations based, at least in part, on at least one of item size, item weight, or item temperature;
      selecting, using the central order management system, the preferred source location to be the fulfillment center in response to determining that the retail item is available at the fulfillment center;
      selecting, using the central order management system, the preferred source location to be the retail store in response to determining that it is undesirable or unsafe to transport the retail item between the different source locations; and
      selecting, using the central order management system, the preferred source location to be the retail store in response to determining that the retail item is not available at the fulfillment center;
   preparing a first portion of the order at the fulfillment center, the first portion of the order including retail items for which the fulfillment center is selected as the preferred source location;
   wherein preparing the first portion of the order comprises outputting one or more control signals to automation equipment in the fulfillment center;
   preparing a second portion of the order at the retail store, the second portion of the order including retail items for which the retail store is selected as the preferred source location;
   loading the first portion of the order onto a transportation vehicle for transportation to the retail store; and
   assembling the order comprising the first portion and the second portion at the retail store, wherein for at least one retail item in the order, the at least one retail item in the order is available at both the fulfillment center and the retail store.

2. The method of claim 1, wherein the customer device is selected from the group consisting of a cellular phone, smartphone, personal digital assistant, ultra-mobile PC, computing tablet, a portable media player, a pocket computer, and any combination thereof.

3. The method of claim 1, further comprising assigning, using the central order management system, the retail store to the order from a list of available retail stores that are each located remote from the fulfillment center.

4. The method of claim 3, wherein the assigning the retail store comprises:
   accessing a customer database containing a second set of customer-related data regarding a customer who is placing the order; and
   assigning, from the list of available retail stores, a previously assigned retail store for the customer according to the second set of customer-related data to be the retail store for the order.

5. The method of claim 3, wherein the assigning the retail store comprises enabling a customer placing the order to select the retail store from the list of available retail stores at the time of placing the order.

6. The method of claim 3, further comprising enabling a customer, in placing the order, to select one or more of the plurality of retail items for the order from a list of available retail items that are stocked in the retail store and are not stocked in any other ones of the available retail stores.

7. The method of claim 1, further comprising:
   providing a notification from one or more processing servers to the central order management system in response to a retail item of the first portion of the order being unavailable at the fulfillment center; and in response to the notification, using the central order management system to reassign the preferred source location for the retail item of the first portion of the order from the fulfillment center to the retail store.

8. The method of claim 1, wherein the fulfillment center and the retail store have overlapping retail item inventories, wherein the retail item inventory of the retail store includes a subset of retail items that are available at the retail store and not at the fulfillment center.

9. The method of claim 8, further comprising enabling a customer to select, using one or more computing devices, at least one retail item from within the subset of retail items that are available at the retail store and not at the fulfillment center when placing the order.

10. A system, comprising:
a fulfillment center;
a retail store located remote from the fulfillment center;
a central order management system comprising a first processor and a first memory device coupled to the first processor, the first memory device comprising instructions executable by the first processor that, when executed, cause the first processor of the central order management system to:
  receive, from a customer device, data related to an order of a plurality of retail items for pick-up or delivery, wherein the data from the customer device is packaged in a first data structure;
  parse the data packaged in the first data structure into a second data structure by creating one or more order records comprising a first set of customer-related data, store-related data associated with the retail store, and at least one of the plurality of retail items, wherein the second data structure is suitable for storage in an order database and the first data structure is not suitable for storage in the order database;
  store the parsed data in the order database; and
  select, for each retail item in the order, a preferred source location from which to source a retail item of the plurality of retail items, the preferred source location being selected from the group consisting of: the fulfillment center and the retail store, wherein the instructions that further cause the first processor to select the preferred source location for each retail item in the order comprise instructions that, when executed, cause the first processor to:
    select the preferred source location to be the fulfillment center in response to determining that the retail item is available at the fulfillment center;
    select the preferred source location to be the retail store in response to determining that it is undesirable or unsafe to transport the retail item between different source locations; and
    select the preferred source location to be the retail store in response to determining that the retail item is not available at the fulfillment center;
one or more order processing servers comprising a second processor and a second memory device coupled to the second processor, the second memory device comprising instructions executable by the second processor that, when executed, cause the second processor of the one or more order processing servers to generate one or more tasks associated with:
  preparing, at the fulfillment center, a first portion of the order including retail items for which the fulfillment center is selected as the preferred source location;
  preparing, at the retail store, a second portion of the order including retail items for which the retail store is selected as the preferred source location;
  loading the first portion of the order onto a transportation vehicle for transportation to the retail store; and
  assembling the order comprising the first portion and the second portion at the retail store, wherein for at least one retail item in the order, the at least one retail item in the order is available at both the fulfillment center and the retail store; and
one or more pieces of automation equipment in the fulfillment center, wherein the executable instructions, when executed, further cause the second processor of the one or more order processing servers to generate the one or more tasks associated with preparing the first portion of the order by outputting one or more control signals for operating the automation equipment.

11. The system of claim 10, further comprising assigning, using the central order management system, the retail store to the order from a list of available retail stores that are each located remote from the fulfillment center.

12. The system of claim 11, wherein the assigning the retail store comprises:
  accessing a customer database containing a second set of customer-related data regarding a customer who is placing the order; and
  assigning, from the list of available retail stores, a previously assigned retail store for the customer according to the second set of customer-related data to be the retail store for the order.

13. The system of claim 11, wherein the assigning the retail store comprises enabling a customer placing the order to select the retail store from the list of available retail stores at the time of placing the order.

14. The system of claim 11, further comprising enabling a customer, in placing the order, to select one or more of the plurality of retail items for the order from a list of available retail items that are stocked in the retail store and are not stocked in any other ones of the available retail stores.

15. The system of claim 10, further comprising:
  providing a notification from the one or more order processing servers to the central order management system in response to a retail item of the first portion of the order being unavailable at the fulfillment center; and
  in response to the notification, using the central order management system to reassign the preferred source location for the retail item of the first portion of the order from the fulfillment center to the retail store.

16. The system of claim 10, wherein the fulfillment center and the retail store have overlapping retail item inventories, wherein the retail item inventory of the retail store includes a subset of retail items that are available at the retail store and not at the fulfillment center.

17. The system of claim 16, further comprising enabling a customer to select, using one or more computing devices, at least one retail item from within the subset of retail items that are available at the retail store and not at the fulfillment center when placing the order.

18. A non-transitory computer-readable storage medium having instructions stored therein, which when executed by a computer cause the computer to perform functions, including functions to:

receive, from a customer device data related to an order of a plurality of retail items for pick-up or delivery, wherein the data from the customer device is packaged in a first data structure;

parse the data packaged in the first data structure into a second data structure by creating one or more order records comprising customer-related data, store-related data associated with a retail store, and at least one of the plurality of retail items, wherein the second data structure is suitable for storage in an order database and the first data structure is not suitable for storage in the order database;

store the parsed data in the order database;

select for each retail item in the order a preferred source location from which to source a retail item of the plurality of retail items, the preferred source location being selected from the group consisting of: a fulfillment center and the retail store, wherein the retail store is located remote from the fulfillment center, and wherein selecting the preferred source location for each retail item in the order comprises:
- determining whether the retail item is undesirable or unsafe to transport between different source locations based, at least in part, on at least one of item size, item weight, or item temperature;
- selecting the preferred source location to be the fulfillment center in response to determining that the retail item is available at the fulfillment center;
- selecting the preferred source location to be the retail store in response to determining that it is undesirable or unsafe to transport the retail item between the different source locations; and
- selecting the preferred source location to be the retail store in response to determining that the retail item is not available at the fulfillment center; and generate one or more tasks associated with:
- preparing, at the fulfillment center, a first portion of the order comprising retail items for which the fulfillment center is selected as the preferred source location, wherein the one or more tasks associated with preparing the first portion comprise outputting one or more control signals to automation equipment in the fulfillment center;
- preparing, at the retail store, a second portion of the order including retail items for which the retail store is selected as the preferred source location;
- loading the first portion of the order onto a transportation vehicle for transportation to the retail store; and
- assembling the order comprising the first portion and the second portion at the retail store, wherein for at least one retail item in the order, the at least one retail item in the order is available at both the fulfillment center and the retail store.

19. The non-transitory computer-readable storage medium of claim 18, wherein the fulfillment center and the retail store have overlapping retail item inventories, wherein the retail item inventory of the retail store includes a subset of retail items that are available at the retail store and not at the fulfillment center.

* * * * *

UNITED STATES PATENT AND TRADEMARK OFFICE
CERTIFICATE OF CORRECTION

| | |
|---|---|
| PATENT NO. | : 11,776,045 B2 |
| APPLICATION NO. | : 17/848242 |
| DATED | : October 3, 2023 |
| INVENTOR(S) | : Kedar Dilip Patel and David Lee Goans, Jr. |

It is certified that error appears in the above-identified patent and that said Letters Patent is hereby corrected as shown below:

On the Title Page

Item [54], and in the Specification Column 1 Line 1 should read:
A METHOD, A SYSTEM, AND A NON-TRANSITORY COMPUTER-READABLE STORAGE MEDIUM FOR FULFILLMENT CENTER AND RETAIL STORE FULFILLMENT OF RETAIL ORDERS Signed and Sealed this
Thirty-first Day of October, 2023

Katherine Kelly Vidal
*Director of the United States Patent and Trademark Office*